(12) United States Patent
Lai et al.

(10) Patent No.: US 12,256,020 B1
(45) Date of Patent: Mar. 18, 2025

(54) SYSTEMS AND METHODS FOR GENERATING ATTESTED DATA

(71) Applicant: Purple Squid LLC, Sheridan, WY (US)

(72) Inventors: Yin Yu Michelle Lai, Singapore (SG); Alan Fairless, Lenexa, KS (US); Sean Mollet, Overland Park, KS (US)

(73) Assignee: Purple Squid LLC, Sheridan, WY (US)

( * ) Notice: Subject to any disclaimer, the term of this patent is extended or adjusted under 35 U.S.C. 154(b) by 0 days.

(21) Appl. No.: 18/750,590

(22) Filed: Jun. 21, 2024

(51) Int. Cl.
*H04L 9/32* (2006.01)
*G06V 10/44* (2022.01)
*G06V 10/764* (2022.01)
*H04L 9/08* (2006.01)

(52) U.S. Cl.
CPC ............ *H04L 9/3247* (2013.01); *G06V 10/44* (2022.01); *G06V 10/764* (2022.01); *H04L 9/0825* (2013.01); *H04L 9/3221* (2013.01)

(58) Field of Classification Search
None
See application file for complete search history.

(56) References Cited

U.S. PATENT DOCUMENTS

| | | | |
|---|---|---|---|
| 9,819,941 B2 * | 11/2017 | Ramasubramonian | ............ H04N 19/597 |
| 11,449,584 B1 | 9/2022 | Pamucci | |
| 11,770,260 B1 | 9/2023 | Pamucci | |
| 12,003,622 B1 * | 6/2024 | Anderson | ............ H04L 9/14 |
| 2004/0022523 A1 | 2/2004 | Duerr et al. | |

(Continued)

FOREIGN PATENT DOCUMENTS

| CN | 116318880 A | 6/2023 |
|---|---|---|
| EP | 3537319 A1 | 9/2019 |

(Continued)

OTHER PUBLICATIONS

Amd Xilinx : "Vivado Design Suite User Guide : Programming and Debugging (UG908)", Bitstream Verify and Readback for FPGAs and MPSoCs, May 30, 2024, 5 pages.

(Continued)

*Primary Examiner* — Bassam A Noaman
(74) *Attorney, Agent, or Firm* — Shook, Hardy & Bacon L.L.P.

(57) ABSTRACT

In various embodiments, systems and methods for generating attested video image data are provided. In some embodiments, an ISP pipeline incorporates a secure cryptographic signing mechanism to digitally sign content-based outputs in a way that attests to the authenticity of the process by which the content was processed before output from the camera. The ISP pipeline may include a hardware security module that inputs video image data from an image sensor, and generates an attestation package that includes attestations about the video content, in combination with an attestation of how it was produced, and signs those attestations together using a key to produce an output comprising attested media data. The ISP pipeline may apply supplemental attestations to the attestation package representing facts associated with the video content that evidence the authenticity. The digital signature applied to the attestation package may use a zero-knowledge proof to describe the signing key.

17 Claims, 8 Drawing Sheets

(56) References Cited

U.S. PATENT DOCUMENTS

| | | | |
|---|---|---|---|
| 2008/0260161 A1* | 10/2008 | Yokota | G11B 20/00818 |
| | | | 380/278 |
| 2012/0198239 A1 | 8/2012 | Oishi | |
| 2017/0373859 A1 | 12/2017 | Shors et al. | |
| 2018/0253567 A1 | 9/2018 | Gonzalez-Banos et al. | |
| 2019/0349204 A1* | 11/2019 | Enke | G06F 21/53 |
| 2020/0302133 A1* | 9/2020 | Ciet | G06F 21/64 |
| 2022/0067129 A1 | 3/2022 | Kumar | |
| 2022/0375298 A1* | 11/2022 | Schertzer | G07F 17/3241 |
| 2023/0385385 A1 | 11/2023 | Ur | |
| 2024/0007292 A1* | 1/2024 | Moon | H04L 9/3247 |
| 2024/0056310 A1* | 2/2024 | Mahara | H04N 21/8352 |
| 2024/0205012 A1* | 6/2024 | Jordan | H04L 9/0866 |
| 2024/0313961 A1* | 9/2024 | Li | H04L 9/30 |

FOREIGN PATENT DOCUMENTS

| | | |
|---|---|---|
| JP | 09-200730 A | 7/1997 |
| JP | 2000-175055 A | 6/2000 |
| JP | 2001-292360 A | 10/2001 |
| WO | 2010/001282 A2 | 1/2010 |
| WO | 2020/037400 A1 | 2/2020 |

OTHER PUBLICATIONS

Boneh, D., "The Zero Knowledge Podcast—Episode 256 : New ZK Use Cases with Dan Boneh", Available at : <https://youtu.be/EKoY8ysGblk?si=tpgA8sDheSgmMlvm&t=920>, Nov. 30, 2022, 4 pages.

Datta et al., "Using ZK Proofs to Fight Disinformation", Medium, Sep. 30, 2022. 12 pages.

Ikonomou, T., "Defence force top brass shares fears about AI causing 'truth decay'", INQueensland, Sep. 15, 2023, 8 pages.

Kang et al., "Fighting AI-generated Audio with Attested Microphones and ZK-SNARKs: the Attested Audio Experiment", Medium, Jun. 13, 2023, pp. 1-9.

Vigliarolo, B., "Sony camera feature hopes to make digital images immune to secret manipulation", The Register—Personal Tech, Aug. 15, 2022. 3 pages.

* cited by examiner

US 12,256,020 B1

SYSTEMS AND METHODS FOR GENERATING ATTESTED DATA

BACKGROUND

In present day society, images (whether still images or video) play a large part in how people understand and perceive the world around them. For example video footage is used in a wide range of applications, such as to document the occurrence of newsworthy and historical events, to provide video surveillance for security, and/or to preserve personal and/or family memories. Often, video footage is considered a more accurate basis for establishing facts than eyewitness testimony. Technology for capturing and producing video image data today typically involves processing digital video data. Image data captured by an image sensor may be processed by an image signal processing (ISP) pipeline to produce a stream of digital image frames comprising a video image of events captured by the image sensor.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in isolation to determine the scope of the claimed subject matter.

Embodiments described herein provide for, among other things, an image signal processing (ISP) pipeline that incorporates a secure cryptographic signing mechanism that allows a camera to digitally sign video image data outputs in a way that attests to the authenticity of the process by which the content was processed before output from the camera. More specifically, an ISP pipeline may be implemented within a hardware security module of the camera that is coupled to the image sensor. The ISP pipeline implemented within the hardware security module inputs video image data from the image sensor, and may generate an attestation package that includes at least an attestation of what the video content is, in combination with an attestation of how it was produced, and signs those attestations together, using a digital key to produce an output comprising attested media data. The ISP pipeline may further apply, to the attestation package, one or more supplemental attestations that represent one or more facts associated with the video content that may be used to varying degrees to evidence the authenticity of the video content. Zero knowledge proofs may be applied to the attestation package to optionally limit the granularity of disclosure.

BRIEF DESCRIPTION OF THE DRAWINGS

The embodiments presented in this disclosure related to systems, methods, and technologies for generating attested video image data are described in detail below with reference to the attached drawing figures, which illustrate non-limiting examples of the disclosed subject matter, wherein.

DETAILED DESCRIPTION

Figure 1:
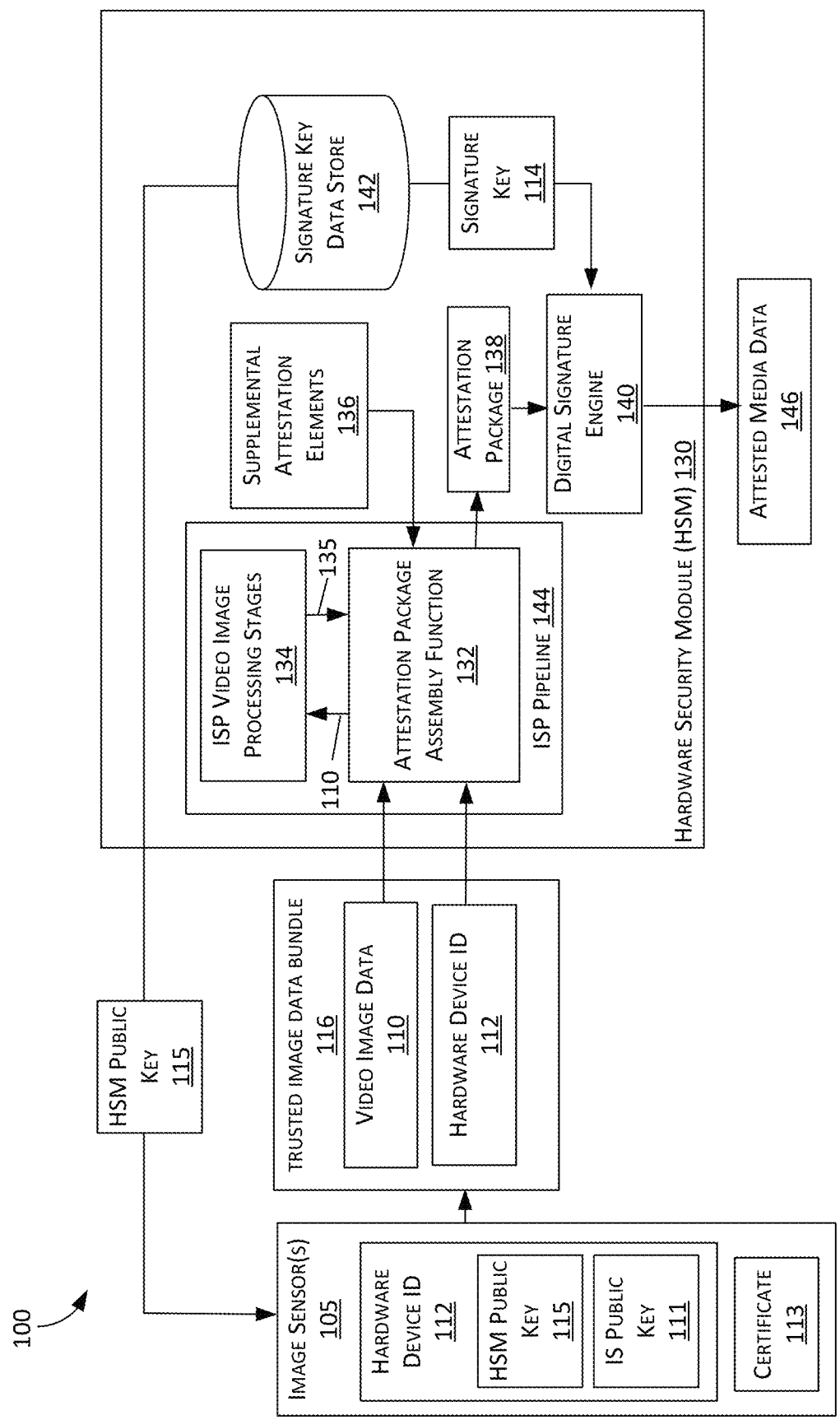
FIG. 1 is a data flow diagram illustrating a process for an example attestation-based video image processing system, in accordance with embodiments of this disclosure.

This detailed description is provided in order to meet statutory requirements. However, this description is not intended to limit the scope of the disclosure described herein. Rather, the claimed subject matter may be embodied in different ways, to include different steps, combinations of steps, different elements, and/or different combinations of elements, similar to those described herein, and in conjunction with other present or future technologies. Moreover, although the term "step" may be used herein to identify different elements of methods employed, the terms should not be interpreted as implying any particular order among or between different elements except when the order is explicitly described.

In general, this disclosure is directed to embodiments for an ISP pipeline that incorporates a secure cryptographic signing mechanism for generating attested video image data from image sensor generated video image data. Although people tend to hold great confidence in the accuracy of video image footage, establishing the authenticity of video footage and other images purportedly generated from an image sensor and an ISP pipeline represents a challenge given the technologies available today for post-processing image data. For example, image data (including video image data) often undergoes down-sampling and recompression operations that can destroy forensic clues intrinsic to the image data as originally captured. Image editing software can be used to manipulate pixel values of an image frame using sophisticated filters or other algorithms. Moreover, generative artificial intelligence (GAI) technologies can synthetically produce high-quality images that very closely resemble authentic photographs and/or video recordings, making it challenging to identify video footage that is fabricated or otherwise manipulated to produce content that misrepresents real-life events.

An example technology available today that may be used to facilitate deciphering accurate versus manipulated image data includes image editing software applications that apply digital signatures to each of the editing steps applied to a still image (e.g., cropping and/or lighting corrections) to demonstrate that a derivative image was non-deceptively edited from an original, or to otherwise clearly document what edits were applied. Another technology includes the embedding of a digital signature engine within the hardware of a camera to apply a digital signature to a still image. However, video encoding and compression processes are much more complex than that of a still frame image capture, and the techniques for signing still images are not directly applicable to video. For example, the streaming delivery of video content over networks often inherently involves manipulation of the video image data in a way that could invalidate the type of signatures typically applied to a still image.

In contrast to such conventional technologies, embodiments described herein provide for, among other things, an ISP pipeline that incorporates a secure cryptographic signing mechanism that allows a camera to digitally sign video image data outputs in a way that attests to the authenticity of the process by which the content was processed before output from the camera. More specifically, an ISP pipeline may be implemented within a hardware security module (e.g., a secure enclave of the processor(s) and/or hardware implementing the ISP pipeline) of the camera that is coupled to the image sensor. The ISP pipeline implemented within the hardware security module receives video image data from the image sensor, and as is more specifically detailed herein, generates an attestation package that includes at least an attestation of what the video content is in combination with an attestation of how it was produced, and signs those attestations together using a digital key to produce an output comprising attested media data. As further described herein, the ISP pipeline may further apply one or more supplemental attestations to the attestation package, where the supplemental attestations represent information (e.g., one or more facts) associated with the video content, which may be used to varying degrees to evidence the authenticity of the video content.

In some embodiments, a camera may output attested media data that comprises a complete complement of the attestations included in the attestation package generated for an item of video image content. In some other embodiments, the hardware security module provides for a selective disclosure scheme that permits a user of the camera to selectively redact one or more of the attestations from the attested media data output from the camera. For example, a supplemental attestation applied to the attestation package may include data indicating a precise location of where the video image content was captured, which may be information that the user does not want to be included in attested media data made available to the public. In such a case, the user may select a preference option that excludes the precise location data from the attested media data output. A selective disclosure scheme may be used such that selective redaction of chosen attestations may be performed, without invalidating the digital signature with regard to the remaining attestations.

In some embodiments, the digital signature applied to the attestation package uses zero-knowledge proof technology. As discussed herein, and as one possible approach, at the time a video is recorded, a session key is generated and used to sign each segment of video during the session. When the session is started, the session key is itself signed by a chain of keys identifying the hardware. Also when the session is started, a zero-knowledge proof is made showing that the session key is signed by a key in the published database of authentic hardware keys, without revealing which key. In some embodiments, the zero-knowledge proof may be made with the assistance of external systems (for example, for computing performance reasons.) In other words, a zero-knowledge proof may be generated once, for the whole recording session, as opposed to being generated with each output. When the video content is published, a user has the choice of either sharing the signature directly and identifying the specific hardware, or sharing the zero-knowledge proof. In some embodiments, additional zero-knowledge proof(s) may be made, showing the inclusion of a signing key in additional published databases, or having some credential as defined by a blockchain protocol.

Zero-knowledge proving is a cryptographic technique that allows a first entity to demonstrate to another entity that certain statements about some data are true, without revealing any additional information. The first entity produces a credential (i.e. a zero-knowledge proof) that a different entity can use to verify the truth of the statements, without revealing other information (for example, the first entity's identity). For example, a zero-knowledge proof may authenticate that the signature key is vouched for as authentic by a trustworthy entity (e.g., trusted camera hardware) without further providing any identifying information about the entity (e.g., not indicating identifying data of the camera that captured the video data). As such, numerous sets of video content may be generated by the camera as attested media data without consumers of the video content having the ability to link the numerous sets of video content to a common source based on the digital signature.

In some embodiments, the attested media data output may include representations of features (e.g., peoples, animals, objects, etc.) detected and/or extracted from the video image data instead of, or in addition to, video image frames. A machine learning model may be trained to detect and classify features from the video image data and assign one or more classifications. As an example, the machine learning model may generate an output representing the video image data that comprises an indication of how many people are present in the scene captured by the video image data, an identification of one or more objects present in the scene, and/or an inference of one or more actions or activities taking place in the scene based on the behaviors, positions, and/or movement of people and/or objects within the scene. For privacy-sensitive context scenarios, the attested media data output may provide a real-time indication of what is occurring, without further revealing video images that could be used to identify the people involved. In some embodiments, the machine learning mode and/or other machine vision algorithm may generate a machine vision-based rendering of a scene captured by the image sensor using generic computer-synthesized representations of people appearing in the scene. In some embodiments, the attestation package may be generated to include the machine learning model-produced inferences (e.g., a tokenization of one or more features extracted from the image data) without the video image data, with at least one of the attestations included in the attestation package generated to attest to the fact that the attestation package does not include the video image footage.

Referring now to FIG. 1, FIG. 1 is a data flow diagram illustrating a process for an example attestation-based video image processing system 100 in accordance with embodiments of this disclosure. One or more of the components shown in FIG. 1 can be implemented, at least in part, via any type of computing device, such as one or more of computing device 700 described in connection to FIG. 7, or at least in part within a cloud computing environment 800, as further described with respect to FIG. 8, for example.

As shown in FIG. 1, the attestation-based video image processing system 100 comprises one or more image sensors 105 that is coupled to a hardware security module 130. Image sensor(s) 105 may comprise any form of optical sensors such as, but not limited to, a camera, an RGB camera sensor, an RGB-IR camera sensor, a greyscale camera sensor, or any other form of sensor that captures light to produce video image data, such as video image data 110. In some embodiments, one or more image sensors 105 may comprise an array of sensors that operate together and/or are otherwise arranged as a system of sensors. In some embodiments, video image data 110 generated by the image sensor(s) 105 may comprise a stream of video image frames, each frame representing a unit of video image data 110 captured at a point in time. As described in further detail herein, the hardware security module 130 processes video image data 110 to generate a corresponding set of attested media data 146. The attested media data 146 comprises a digitally signed data structure that includes one or more attestations that evidence the authenticity of information about and/or derived from video image data 110. It should be understood that in some embodiments, image sensor(s) 105 may include one or more audio sensors for capturing sound data contemporaneously with image data and that video image data 110 in such embodiments may carry that sound data. It is also contemplated that in some embodiments, optical image sensor(s) may be substituted or supplemented with non-optical sensors that use active probing and/or are more suited for sensing the desired surrounding environment, such as RADAR, LIDAR, Celldar, or side scan sonar (e.g., for detecting and imaging objects on the seafloor).

As shown in FIG. 1, the image sensor(s) 105 and hardware security module 130 share predetermined keys and identifiers so that the hardware security module 130 can ensure that it receives video image data 110 that can be trusted and attested to. That is, the image sensor(s) 105 and hardware security module 130 are paired to prevent one or more attacks/exploits against the attestation-based video image processing system 100. For example, an attacker should not be able to exploit the system by supplying externally generated image data (e.g., from another image sensor, or from another data source) into the hardware security module 130. In other words, the hardware security module 130 should accept video image data 110 input from its paired image sensor(s) 105, but not from other sources. Even an attacker that can interpose their own communication (e.g., a man-in-the-middle attack) between the hardware security module 130 and image sensor(s) 105 should not be able to feed the hardware security module 130 data as if it were from the image sensor(s) 105. In some embodiments, image sensor(s) 105 and hardware security module 130 may form a dedicated pair such that the hardware security module 130 only accepts data from specific image sensor(s) 105. In some embodiments, at the time of assembly, the hardware security module 130 is programmed to be incompatible (i.e., not pair) within any image sensor 105 that does not present a certificate 113 signed by a whitelisted set of signing keys. That is, the hardware security module 130 may include a signature key data store 142 (discussed in greater detail below) and may not proceed with pairing with an image sensor 105 that does not present a certificate 113 indicated as valid based on the signature key data store 142. In some embodiments the signature key data store 142 may be programmed (e.g., at assembly time) with a list of certificates and/or sign keys it may accept from an image sensor 105 and only pair with such image sensors.

More specifically, the image sensor(s) 105 may comprise a hardware device identifier (ID) 112 (or similar identifier) that uniquely identifies image sensor(s) 105 as a device. In some embodiments, the hardware device ID 112 may be a factory assigned ID securely stored in firmware or hard-coded into circuitry of the image sensor(s) 105. In some embodiments, an image sensor 105 may generate and store a key pair (i.e., public key and private key) unique to the device. In some embodiments, the hardware device ID 112 may be at least in part derived from a certificate 113 that may be programmed into the image sensor(s) 105 and signed by the image sensor(s) 105 manufacturer. The certificate 113 may include, for example, one or more of, but not limited to, a public/private key pair, a lot number and/or serial number. In some embodiments, the image sensor(s) 105 may receive from the hardware security module 130 (e.g., from the signature key data store 142) a hardware security module (HSM) public key 115 (e.g., during the key exchange process discussed below) for the hardware security module 130. As shown in FIG. 1, the hardware device ID 112 may therefore include the IS public key 111 and the HSM public key 115.

The device's key pairs and certificate 113 may therefore be used in an authenticated key exchange protocol to secure the internal communication between the image sensor(s) 105 and hardware security module 130. Securing this communication may serve to prevent the attacks based on supplying externally generated image data (e.g., from another image sensor, or from another data source) into the hardware security module 130. That is, the hardware security module 130 could accept video image data 110 input from its paired image sensor(s) 105 but not from other sources.

In some embodiments, the signature key data store 142 may include a library or database of one or more signature keys, or key generating algorithm(s), or a digital certificate signed by a hardware manufacturer associated with at least one signature key 114 designated for use with attesting video image data 110 from the image sensor(s) 105. The hardware security module 130 and image sensor(s) 105 may be paired, as discussed above, so that the hardware security module 130 authenticates the image sensor(s) 105 based on the latter passing a challenge during, at the time of, or upon device initialization (e.g., camera power-up or startup). For example, the image sensor(s) 105 may need to pass an interactive cryptographic challenge from the hardware security module 130 (e.g., proving that it has the private key associated with the IS public key 111 that the hardware security module 130 knows and was paired with at manufacture time; and/or proving that it has the private key associated with a certificate signed by the manufacturer indicating a specific hardware ID or serial number). In some embodiments, the signature key 114 comprises a cryptographic key encapsulated in the hardware of the hardware security module 130 at time of manufacture, and not made available to higher level software executing outside of the hardware security module 130. The signature key 114 may be generated by the hardware security module 130 and combined with a certificate received, for example, during assembly and stored to the signature key data store 142. This certificate may include a public key of the image sensor(s) 105 and a public key of the hardware security module 130—and may represent a hardware identifier for the video image processing system 100. In some embodiments, the certificate may be included into a published database of authentic video image processing systems, for example to facilitate zero knowledge proof (ZKP) generation, as will be described. This signature key 114 may be used to sign an ephemeral signature key at the start of each video session, with the resulting signature showing that the video session is from an authentic device, and further, indicating which specific device the video session was recorded on. As further discussed below, at the time of publication, the user may apply selective disclosure options for sharing the ZKP, the signature, and/or other attestation elements, depending on how much they wish to disclose.

In operation, when the image sensor(s) 105 outputs video image data 110 to the hardware security module 130, the video image data 110 is comprised within a trusted image data bundle 116 that further includes the hardware device ID 112. For example, the trusted image data bundle 116 may be trusted at least because the image sensor(s) 105 is authenticated by the hardware security module 130 upon device initialization, and communication thereafter may use cryptographic message authentication. The combination of the video image data 110 with the hardware device ID 112 that includes certificate 113 indicates to the hardware security module 130 that the trusted image data bundle 116 is being received from the image sensor(s) 105, as opposed to another (untrusted) source. In some embodiments, the hardware security module 130 can validate the source of the video image data 110 as coming from the image sensor(s) 105 based on the hardware device ID 112 and further based on the fact that the image sensor(s) 105 was able to authenticate with hardware security module 130 based on the certificate 113 (e.g., using an interactive cryptographic challenge) at the time of, during, or upon device initialization.

When a fully assembled attestation-based video image processing system 100 is initialized (e.g., at, during, or upon startup or power-up) the hardware security module 130 and the image sensor(s) 105 may perform an authentication handshake that initiates a challenge-response protocol, for example in the form of a key exchange. During the key exchange, the HSM 130 may obtain from the signature key data store 142 the public key for the image sensor(s) 105 (obtained during pairing) that may be used to derive an ephemeral key that can be used for periodic challenge/response exchanges between the hardware security module 130 and the image sensor(s) 105 and/or content authentication. In some embodiments, the key exchange made between the hardware security module 130 and the image sensor(s) 105 may also provide the hardware security module 130 with the public key to the image sensor(s) 105. As previously mentioned, the hardware device ID 112 communicated by the image sensor(s) 105 to the hardware security module 130 may include both the image sensor public key 111 and the hardware security module public key 115 (which is the public portion of signature key 114.).

Figure 7:
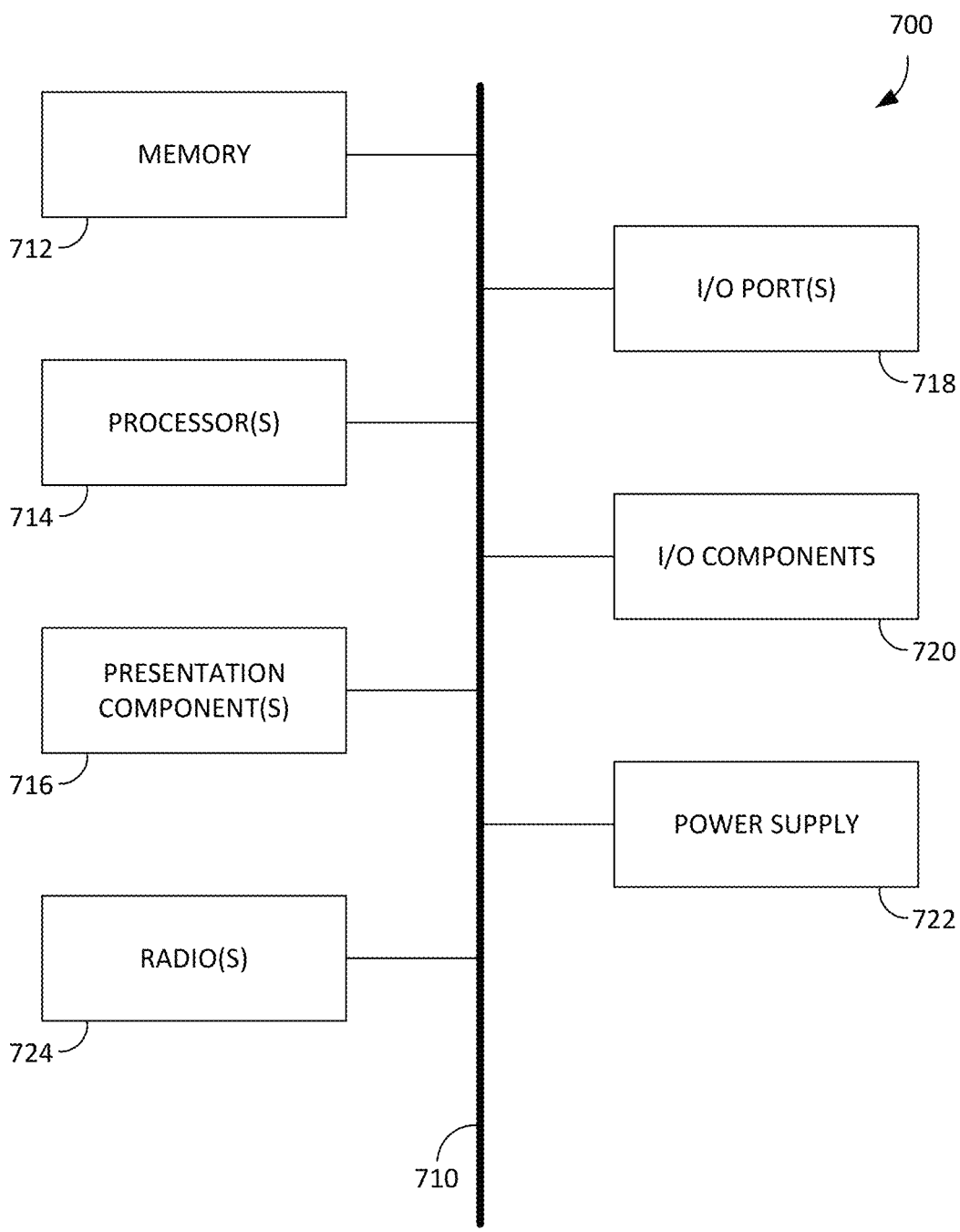
FIG. 7 is a diagram of an exemplary computing environment, in accordance with embodiments of the present disclosure.

The hardware security module 130 may be implemented within a secured environment (e.g., a secured enclave and/or trusted execution environment) of a computing device (e.g., the computing device 700 of FIG. 7, for example). Hardware security module 130 implements an ISP pipeline 144 that includes one or more ISP video image processing stages 134 and an attestation package assembly function 132. Based on the trusted image data bundle 116 from the image sensor(s) 105, the ISP pipeline 144 may apply ISP video image processing stages 134 to the video image data 110 (e.g., image adjustments, video encoding, feature classifications, etc.) to produce an output 135 representing the processed video image data to the attestation package assembly function 132. The output 135 from the ISP video image processing stages 134 may include an adjusted version of the video image data 110 (e.g., adjusted for demosaicing, color corrections, white balance, or other image processing parameters), and encoded using a video codec for streaming or distribution, such as but not limited to High-Efficiency Video Coding (HEVC, H.265), Advanced Video Coding (H.264), AOMedia Video 1 (AV1), a Moving Picture Experts Group (MPEG) codec, or other video codec.

The output 135 from the ISP video image processing stages 134 may include other data representing the processed video image data, such as a machine vision-based rendering of a scene captured by the image sensor and/or one or more classifications characterizing one or more features extracted from the image data and/or inferred from features detected from the video image data.

For example, in some scenarios it may be preferable to publish select information about the video image data 110 without supplying the actual video content (i.e., the viewable footage). For such cases, the output 135 may include image classifications without outputting the actual video content. Omitting actual video content from the attested media data 146 could make the use of cameras acceptable in cases where it would otherwise not be appropriate, for example, due to privacy concerns. By way of example, in private spaces such as bathrooms, attested media data 146 could indicate—without outputting the actual video content—whether visitors wash their hands before leaving (which may be used to generate an audible reminder), and/or detection of activities classified as illegal and/or inappropriate. Or, for example, in spaces inside or near organizations performing services of a sensitive nature, such as infectious disease treatment or abortion services, users, employees and/or service providers may prefer to avoid being unduly recorded; in this case, organizations can still operate surveillance cameras for security purposes without jeopardizing the privacy of individuals.

As such, in various different embodiments, the attested media data 146 may include, for example: 1) a representation of the video image data 110 comprising an unencrypted version of the video image data 110, 2) a representation of the video image data 110 that comprises no video content, but does include metadata and/or other representations derived from the video image data 110 (such as generated by the feature classification model 434 discussed below, for example)—with an attestation that no video was output, 3) a representation of the video image data 110 comprising video content that is encrypted with an externally supplied public key—with an attestation that encrypted video was output, and which externally supplied public key was used in the encryption. In the latter use case, access to the corresponding external secret key may be restricted to only select people, and/or stored in a separate and external HSM with its own systems of access control. This latter use case supports situations where the direct operators of a security system (e.g., local on-site security staff) are not allowed unrestricted access to video footage, but other more trusted personnel can access it with the external secret key.

Based at least on the output 135 from the ISP video image processing stages 134 as a representation of the video image data 110, and the hardware device ID 112, the attestation package assembly function 132 produces an attestation package 138 that includes at least a first attestation of what the video content is (e.g., the video image data 110 and/or the representation of the video image data produced by the ISP pipeline 144), in combination with a second attestation of how it was produced (e.g., by a trusted image sensor(s) 105). The digital signature engine 140 signs those attestations together using the signature key 114 (e.g., the signature key 114 retrieved from the signature key data store 142 of the hardware security module 130) to produce the attested media data 146. The digitally signed attestations help establish that the representation of the video image data included in the attested media data 146 was based on video data recorded by a real image sensor and not created or modified by a deepfake, GAI, simulation, and/or computer-generated imagery (CGI).

In some embodiments, the attestation package 138 may be augmented by the attestation package assembly function 132 by including one or more supplemental attestation elements 136 in an attestation package 138. The attestation package 138, including supplemental attestation elements 136, would then be digitally signed as a whole by the digital signature engine 140 using the signature key 114. Supplemental attestation elements 136 may represent one or more facts associated with the video image data 110 that may be used to varying degrees to evidence the authenticity of the representation of video image data included in the attested media data 146. Supplemental attestation elements 136 may include additional attestations internally generated by the hardware security module 130 itself. For example, the hardware security module 130 may generate an image data pipeline description that identifies one or more processes applied to the video image data 110 by the ISP video image processing stages 134 to produce the representation of the image data 135 included in the attestation package 138. For example, the image data pipeline description may indicate what image adjustments and/or filters were applied to the image data, what video codecs were used, and/or what elements were produced by a machine learning model. The attestation package assembly function 132 may add such image data pipeline description information to the attestation package 138 as a supplemental attestation.

Because the data rates involved in real-time transition of the video image data 110 from the image sensor(s) 105 to the hardware security module 130 are high (e.g., on the order of 50 gigabits/sec), content encryption of the video image data 110 can be challenging and computing resource intensive. In some embodiments, video image data 110 may instead be authenticated using a hashing process. For example, the image sensor(s) 105 may transmit a content hash with each frame of video included in the video image data 110. In some embodiments, the hash may be calculated by the image sensor(s) 105 at least in part based on the ephemeral key established during the key exchange (e.g., when the system is initialized). Using such a hash prevents content tampering by an attacker who can inject malicious data in the communications between the image sensor(s) 105 and the hardware security module 130.

Other supplemental attestation elements 136 may represent hash digests of raw video image data 110 as received from the image sensor(s) 105 and/or hash digests of the representation of the image data 135 after processing and/or encoding by the ISP video image processing stages 134. For example, supplemental attestation element 136 may be produced based on a hash function, such as a perceptual hash of the raw video image data 110. A perceptual hash is a type of locality-sensitive hashing (LSH) that can be used to hash similar input items into the same grouping based on a correlation between hashes. That is, perceptual hashing evaluates images for similarity of the images as opposed to the specific content depicted. As such, a hash digest computed by applying a perceptual hash to the raw video image data 110 may still be able to provide a valid supplemental attestation element for the representation of the image data 135 processed and/or encoded by the ISP video image processing stages 134. Similarly, a supplemental attestation element 136 may be produced based on a perceptual hash of the representation of the image data 135 output, produced by the ISP video image processing stages 134, to produce a hash digest that incorporates the effects of filtering, encoding, and/or compression operations.

Other supplemental attestation elements 136 may be derived based on data obtained by the hardware security module 130 from external sources, such as sensor data representing measurements of environmental parameters, time data from clocks, location data from navigation receivers (e.g., position data from a global navigation satellite system, and/or pseudo-random-noise (PRN) codes), an asymmetric encryption key, health data (such as heart rate and skin temperature), and/or data received from a blockchain. It is contemplated within the scope of the present disclosure that such external sources may include devices, sensors, or components, among other things, directly or indirectly coupled to, or directly or indirectly in communication with, the device in which the hardware security module 130 is integrated. As non-limiting examples, supplemental attestation elements 136 from sensor data may include temperature, humidity, barometric data, and/or other environmental measurements captured contemporaneously with the video image data 110. Supplemental attestation elements 136 from sensor data may include sound (audio) data captured contemporaneously with the video image data 110. For such supplemental attestation elements 136, including such information into the attestation package 138 is not necessarily to provide an attestation of the supplemental data, but more to attest that the video image data 110 was captured by the image sensor(s) 105 at the same time the supplemental data represented by the supplemental attestation elements 136 was captured or otherwise collected. In some embodiments, supplemental attestation elements 136 may include data obtained from a blockchain (e.g., whose decentralized and cryptographically-secured nature provides higher confidence of incorruptibility than centralized sources). For example, as the image sensor(s) 105 and hardware security module 130 begin a session to capture video content, hardware security module 130 may receive as input the result of a query to a server or other network resource for a block of data traceable back to a blockchain or related technology. Or, blockchain data can be pulled from lightweight blockchain nodes run locally on consumer devices. In some embodiments, data from a session may be posted to a blockchain or related technology; such data traceable back to a blockchain may be used to prove the time the video image data 110 was captured. In some embodiments, a manufacturer may post hardware identifiers to a blockchain or related technology; such data traceable back to a blockchain may be used to provide proof that the attested media data originated from an image sensor(s) 105 and/or hardware device ID 112 known to the manufacturer.

It should be understood that when downloading data from or submitting data to a blockchain, interactions may include direct and indirect forms of interaction with the blockchain. For example, data may be routed through parties that run miners, validators, oracles, relays, zero knowledge proof aggregators, data availability service providers, wallet operators, remote procedure call operators, cross-chain or cross-layer bridge operators, and/or other blockchain or blockchain-adjacent player in the various functional layers of a blockchain (e.g. consensus, execution and application layers). Further, data that is eventually submitted to the blockchain may be further compressed, and may exist only ephemerally on the blockchain. In addition, to conserve the cost related to interacting with blockchains, compressed data that is submitted to the blockchain may be paired with less compressed data that is submitted to data storage services run by centralized organizations (e.g. cloud services run by tech companies) or decentralized data storage services (e.g. the Interplanetary File System, run by independent node operators). References herein to blockchains may include all categories, whether public or private, and permissioned or permissionless.

As illustrated in FIG. 1, the attestation-based video image processing system 100 can also facilitate remote blockchain transactions. In some embodiments, the system 100 may rely on a higher-level component, such as the operating system of the computing device, to generate and submit these transactions. This involves the higher level component providing the system 100 with necessary inputs for the blockchain transaction. The higher-level component then handles the network activity required to submit the prepared transaction to the blockchain. In some embodiments, the higher-level component or an external component may be enlisted for computationally-intensive operations necessary for preparing transactions for submission to the blockchain.

Content submitted to a blockchain may include, for example, a precommitment of the system's output, such as the root hash of the attested media data 146. This can offer evidence that the data was created no later than the submission time, ensuring the integrity of the attested media data 146. Additionally, including externally-sourced blockchain data attestations among the attested media data 146 can provide strong evidence that the data was created no earlier than the time the externally-sourced data became part of the blockchain.

By submitting a precommitment hash to a blockchain, in accordance with some embodiments, the proof logic remains valid even if the capturing device (e.g., system 100) is not connected to the Internet at the time of data capture. In this regard, when the capturing device later connects to the Internet and transmits data to the blockchain, it can provide evidence that the attested media data 146 was created at or before the submission time. This feature can support subsequent selective disclosure and validation against the blockchain submission, as will be further described.

Figure 2:
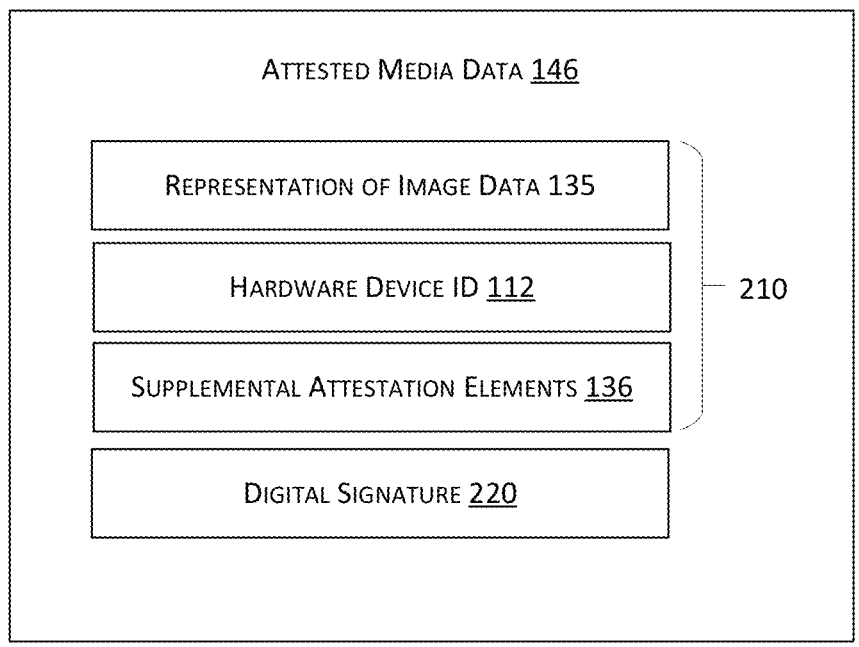
FIG. 2 is a diagram illustrating an example set of attested media data, in accordance with embodiments of this disclosure.

Referring now to FIG. 2, FIG. 2 is a diagram illustrating a data structure for a set of attested media data 146. The attested media data 146 may include a set (e.g., one or more, a plurality) of attestations 210 based on the attestations package 138 produced by the attestation package assembly function 132. As shown in FIG. 2, the plurality of attestations 210 may include, for example, one or both of: the representation of image data 135 (which is derived from the video image data 110 as described herein) and the hardware device ID 112 corresponding to the image sensor(s) 105 that captured the video image data 110, used to derive the representation of image data 135. Moreover, the plurality of attestations 210 may include one or more supplemental attestation elements 136. The set of attestations 210 are signed by the digital signature engine 140, which applies the video session ephemeral signature key (itself signed by the signature key 114 at the start of the session) to the attestations package 138, thus creating a digital signature 220 (e.g., a cryptographic signature). By generating attested media data 146 based on such attestations as described herein, a downstream user receiving content based on the attested media data 146 can validate the attestations by using the digital signature 220 and assess that the content was actually generated based on video image data captured by the image sensor(s) 105.

The set of attested media data 146 may comprise a tree structure comprising data fields representing individual attestations of the plurality of attestations 210 and the digital signature 220. In some embodiments, each segment of the tree structure may include an arbitrary number of label-value pair data fields. At any given level of the tree structure, the labels of the data fields may identify specific attestations and may be unique within that level. The labels and the values of data fields representing the attestation(s) may both comprise binary strings of arbitrary bytes. Collectively these data fields may be referred to as metadata providing different forms of attestations associated with video image data 110, and may be arranged in a hash tree, the root of which is signed by an ephemeral key signed by the signature key 114. In some embodiments, at least one data field may include a root output from a previous video segment (further discussed below), forming a chain, or a sentinel, indicating the first segment of a video session. A data field's value may itself be the root hash of a subtree of grouped data fields, and branches of the tree structure can extend recursively to an arbitrary depth.

In some embodiments, the signature key 114 represents a private key used by the digital signature engine 140 to generate and apply the digital signature 220 to the set of attestations 210. In some embodiments, the digital signature engine 140 uses a ZKP cryptographic method/protocol to generate and apply the digital signature 220 to the set of attestations 210 based on the signature key 114. For example, a ZKP may be created at the start of a video session for the purpose of providing a limited disclosure about the identity of the hardware that is recording the video content—to prove that the hardware is included in a published database of authentic hardware without revealing the actual hardware identifiers. The ZKP may be used as a proof that a session signature key generated for a session is itself signed by signature key 114, for which the public portion (i.e. HSM public key 115) is part of the published database of authentic hardware, as described herein. In some embodiments, when a recording session is started, a ZKP may be generated at the start of the session, and from that point, segment outputs are signed by a session key. The resulting digital signature 220 thus provides a user receiving the attested media data 146 the ability to verify one or more truths about the information conveyed by the representation of image data 135 without revealing the underlying information. The signature key 114 used by the digital signature engine 140 is generated directly by the HSM and the secret portion is not accessible to other components.

With respect to the above mentioned video sessions, in some embodiments, when the image sensor(s) 105 begins capturing video image data 110 and sending the trusted image data bundle 116 (e.g., with the video image data 110) to the hardware security module 130, the hardware security module 130 starts a new video session. The video session may continue for as long as video image data 110 is continuously captured by the image sensor(s) 105. A video session may be completed when capturing of video image data 110 is stopped. When a new video session commences, in some embodiments, a new signature key 114 (e.g., asymmetric encryption key pair) may be generated, which operates as a session key for the newly-initiated video session. That is, the signature key may be associated with a video session comprising a continuously captured video image sequence of the image data. The signature key 114 may itself be signed by a key or chain of keys, at least one member of which identifies (e.g., based on hardware manufacturer and/or individual hardware device serial number), or otherwise can be associated with, the hardware device ID 112 of the image sensor(s) 105 such that subsequent signatures made using the signature key 114 can be firmly associated with the hardware device ID 112. In some embodiments, when a new video session is started, a new symmetric encryption key (e.g., a segment ID key) may be created and signed by the signature key 114. This segment ID key may be used, for example, in conjunction with a block cipher in counter mode, the output of which may be used to uniquely number and identify output video segments used to produce the attested media data 146. This arrangement allows verification of the correct sequencing of surviving segments from a video session, even if some segments in the chain are corrupted or lost, for example due to storage hardware errors.

In some embodiments, during the length of a single video session, the contents of that session may be linkable, because they are all signed by the same ephemeral session key. Accordingly, the hardware security module 130 may include an automatic session stop/start function so that a plurality of distinct videos may be published that are not linkable to the same device that captured the images. In some embodiments, conversely, to be able to give the user the option to intentionally link separate videos from multiple video sessions, such as sessions that are adjacent or near-adjacent to each other in time, each segment may include a previous session ID data field that indicates, for example, a public signing key of a previous session.

In some embodiments, the hardware security module 130 may generate a zero-knowledge proof to facilitate proving that the signature key 114 is signed based on a hardware key associated with the image sensor(s) 105 (and/or hardware device ID 112). Based on the zero-knowledge proof, the digital signature 220 applied to the attested media data 146 may disclose general information about the device, such as year, make, or model, but not, for example, a device-specific serial number. As discussed herein, before distributing the attested media data 146, a user may select to disclose general information, while still proving the representation of image data 135 originated from video image data 110 from a real hardware device. This would, for example, allow disclosure of many separate sets of attested media data 146 comprising different video sessions, without revealing which sets of attested media data 146 were produced from the same image sensor(s) 105.

In some embodiments, video image data 110 (and/or associated audio content) captured over a video session may be divided by the hardware security module 130 into distinct segments, which may be of arbitrary time units in length. Segments may be as small as a single video image frame but, as non-limiting examples, could be one second, five seconds, one minute, or longer in duration—where smaller periods may be preferred in some uses cases (e.g. live streaming, earth observation satellites) and larger segments may be desired in other use cases where synchronizing video content with audio is performed and/or where reducing computational workloads of the hardware security module 130 associated with generating signatures is desired. The hardware security module 130 may process a hash chain of segments of continuous video image data 110. For example, an input field to a signed hash of a segment may include a final hash from a previous segment, forming a chain across the input, such that it's possible to demonstrate the relative order and timing associated with selectively disclosed attested media data 146. For example, across a five-minute video session, attested media data 146 may selectively include content up to two minutes, redact content from minutes three and four, and disclose minute five, while indicating that the disclosed content was obtained from the same image sensor(s) 105 and within the same video session, and further indicating that selectively disclosed content is separated by two minutes of redaction. In some embodiments, if one or more segments from a video session are lost or corrupted, later segments may remain cryptographically verifiable from the attested media data 146 based on resyncing past lost or corrupted data. To accomplish this, in some embodiments, output segments of the representation of image data 135 included in the attested media data 146 may be named based on an output from a block cipher operating in counter mode, with the counter incrementing with each output segment. The block cipher setup parameters may be output at the beginning of a video session, and again periodically included in subsequent segments. The block cipher may be keyed with the segment ID key described above.

In some embodiments, the digital signature engine 140 uses a cryptographic signature scheme that allows for a selective disclosure and/or redaction of data fields included in the attested media data 146. That is, when processing video image data 110 during a video session, attested media data 146 is produced based on an attestation package 138 that includes a complete set of attestations 210 signed by the digital signature engine 140 to generate a digital signature 220. At a subsequent time, a content publishing application may input the attested media data 146 and allow a user to apply selective disclosure to choose which data fields of attestations 210 to disclose along with the representation of the image data 135. In this way, the choice of which attestations 210 to disclose or redact may be made at any later time, after the capture and processing of the video image data 110 occurs. In some embodiments, selective disclosure may be applied to each segment of a video session's content, for example, using cryptographic hash blinding and/or a pre-commitment scheme so that individual attestation elements may be included or excluded at publication time. To support selective disclosure, data field contents (keys and values) may be cryptographically blinded (e.g., salted), then hashed, such that the hash digest may be incorporated into a digital signature, and that the signature will be verifiable even if the data field is later redacted from shared output.

In some embodiments, selective disclosure at the time of content publishing may be based on using a digital signature 220 that was generated by the digital signature engine 140 using a commitment scheme. That is, with digital signature 220 applied to the attestations 210, the content publishing application may implement a hash blinding selective disclosure scheme to produce a version of the attested media data 146 (e.g., a distribution version) that selectively redacts the attestations, for example, based on user preference. The digital signature 220 applies over all the data fields in the attested media data 146, but via the content publishing application, the user can choose which of the attestations 210 appear in the distribution version of the attested media data 146, and the digital signature 220 still remains valid and verifiable. In other words, the hardware security module 130 makes a precommitment hash digest of each field of the attestation package 138 when producing the attested media data 146. The digital signature 220 is applied over the precommitment. At the time of publication, a field's content may be revealed or not revealed, but the digital signature 220 is over the precommitment hash digest and continues to validate regardless of what fields are revealed.

Using the content publishing application, a user can publish a distribution version of the attested media data 146 that includes a subset of the attestations 210, with a user-selected subset of the attestations 210 redacted, and the digital signature 220 will still verify. In some embodiments, the digital signature 220 may further be used to identify which attestations 210 were redacted, but not the data fields' labels or values for the redacted attestations 210. For example, starting with a root hash applied to the set of attestations, the content publishing application may parse through the data tree structure and select which branches, and which data fields from each branch/subtree will be published with the distribution version of the attested media data.

Selective disclosure may be implemented in various ways. For example, a rudimentary method would be for the digital signature engine to add an individual signature to each of the data fields of the attested media data 146. Selective disclosure is provided by publishing in the distribution version of the attested media data 146 whichever fields and signatures the user selects using the content publication application. As another method, in some embodiments, the digital signature 220 may be generated based on a hash blinding selective disclosure scheme. That is, when the attested media data 146 is generated at the time of the video session, one or more of the data fields (including their respective label and value) may be blinded (e.g., by adding random data bytes) and then a hash is made over the combination of the blinding bytes, the label, and the value. In this way, the resulting hash for an attestation may be published alone, without the label and value. The blinder bytes can essentially thwart a potential attacker's opportunity to make a brute force or enumeration attack to discover the label and value. In still other embodiments, the digital signature 220 may be applied to the hash for each of the attestations 210, but not the data field labels, values, and/or blinder bytes. The root of the resulting tree of hashes is what is included in the digital signature 220. The total data structure, including blinders, labels, and/or fields, the tree structure, and digital signature 220 is output as the attested media data 146.

Figure 3:
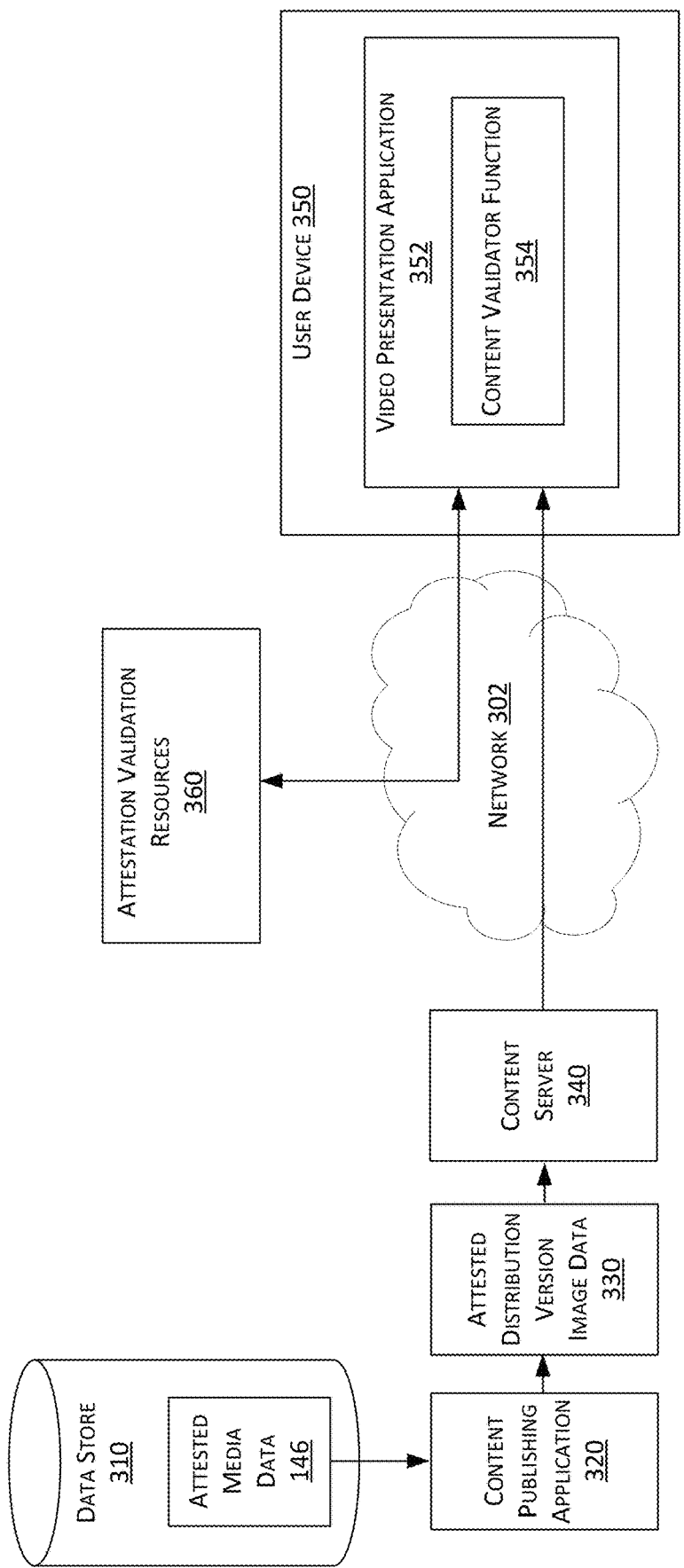
FIG. 3 is a diagram illustrating an example of a publication process for distributing attested media data, in accordance with embodiments of this disclosure.

FIG. 3 is a diagram illustrating an example of a publication process for distributing attested media data 146. The attested media data 146 may be stored, for example, in a data store 310 accessible to a content publishing application 320, such as described above. The content publishing application 320 may comprise software executed by a processor of a computing device, such as computer device 700 described with respect to FIG. 7 (e.g., the content publishing application 320 may be executed on a network server and/or on a user's device locally). One or more functions of the content publishing application 320 may comprise software executed by a cloud computing platform, such as cloud computing platform 800 described with respect to FIG. 8. Based on the attested media data 146, the content publishing application 320 may generate the attested distribution version media data 330, which may be made available to content consumers, for example as streaming and/or downloadable content. For example, the attested distribution version media data 330 may be uploaded to a content server 340 accessible via a network 302 (e.g., the Internet). A video presentation application 352 executing on a user device 350 (e.g., a computing device such as, but not limited to, a desktop computer, a laptop computer, smartphone, tablet, or Internet-connected television) may request and receive the attested distribution version media data 330 from the content server 340 in order to access the representation of the image data 135 for presentation or other processing. In order to validate the representation of the image data 135 based on the attestations 210 and digital signature 220, the video presentation application 352 may include a content validation function 354. In some embodiments, content validation function 354 may extract the digital signature 220 and one or more of the attestations disclosed in the attested distribution version media data 330 and query one or more validation resources 360 (e.g., via network 302) to validate the attestations and establish that the representation of the image data 135 was derived from video image data 110 produced by trusted image capturing hardware (e.g., image sensor(s) 105 and/or hardware security module 130). The content validation function 354 may further validate other information provided by one or more of the supplemental attestation elements 136 included in the attested distribution version media data 330, such as the image data pipeline description and/or related setting and/or information regarding encodings applied, an indication as to whether the representation of the image data 135 does or does not include actual video footage from the video image data 110, or any other data that may be included and made available for selective disclosure. In some embodiments where one or more of the attestations 210 include data obtained from a blockchain or related technology, the content validation function 354 may confirm the validity of that data directly or indirectly from a blockchain or other source that provides or can otherwise validate the data. In some embodiments, the video presentation application 352 may present a computer-generated rendering, computer vision rendering, or other representation of image data based at least on extracted feature characterizations, classifications, and/or tokenizations of one or more features of the video image data 110 included in the representation of the image data 135. In some embodiments, the content validation function 354 is user configurable with respect to which attestations from the attested distribution version media data 330 it attempts to validate. That is, in some embodiments, the video presentation application 352 may display to a user a list of the set of attestations included with the attested distribution version media data 330 and determine which one or more of those attestation are most relevant for the purpose of trusting the representation of the image data 135 for their particular use case. The content validation function 354 may then query the one or more attestation validation resources 360 based on the user-selected preferences.

Figure 4:
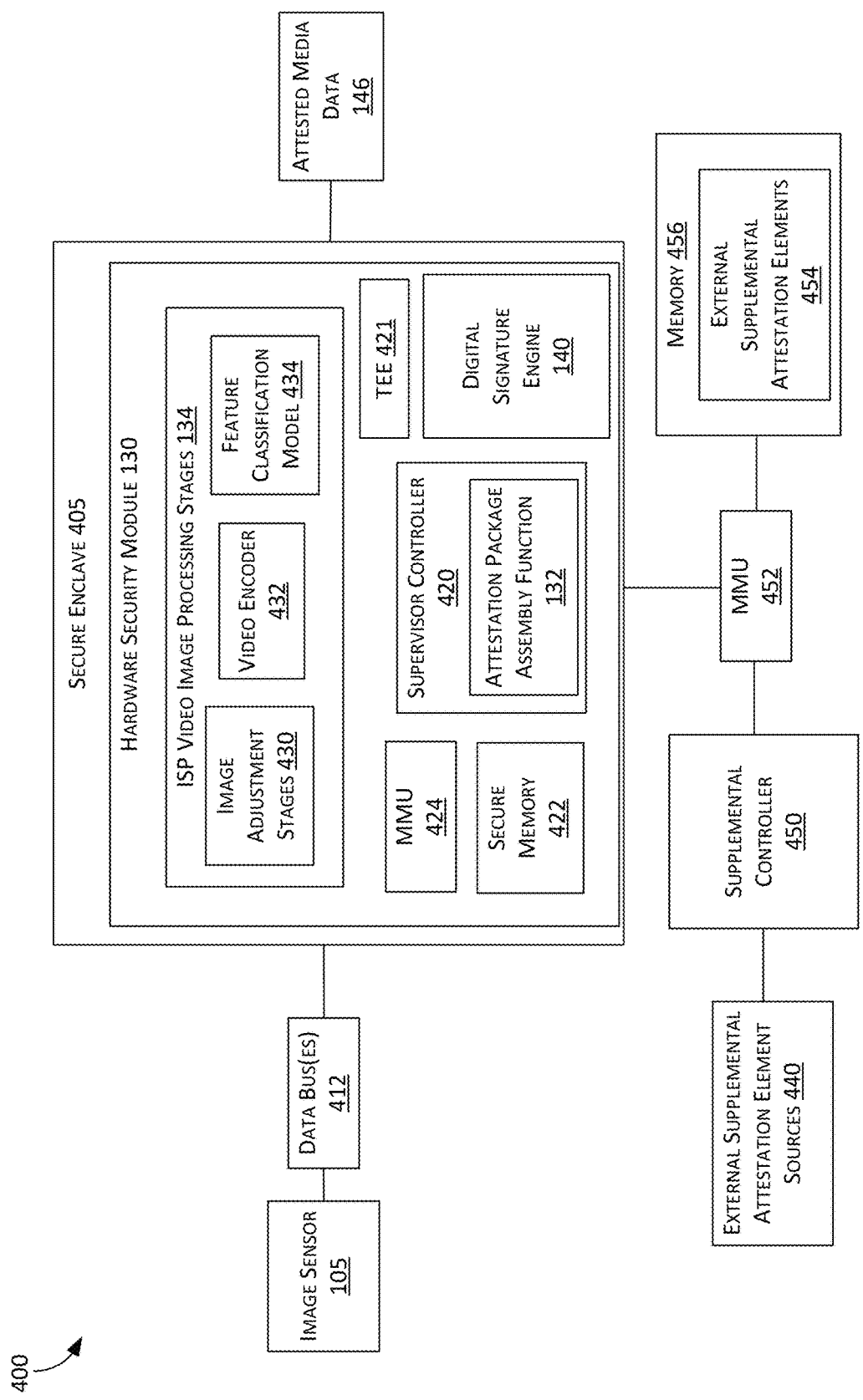
FIG. 4 is a block diagram illustrating an example hardware-secured video processor (HSVP) system, in accordance with embodiments of this disclosure.

Referring now to FIG. 4, FIG. 4 is a block diagram illustrating an example hardware-secured video processor (HSVP) system 400 according to embodiments of this disclosure. In some embodiments, the HSVP system 400 may be integrated into a larger device or system (e.g., a subsystem within a camera device). The HSVP system 400 may comprise the integration of at least one image sensor(s) 105 and hardware security module (HSM) 130, such as described with respect to FIG. 1, to allow for the creation of hardware attested video content such as attested media data 146. The HSVP system 400 thus is able to cryptographically attest to the representation of the image data 135 that it produces, along with information about the processing algorithms and configuration settings used to create the representation of the image data 135. The HSVP system 400 may be realized within a physically tamper-resistant form factor.

In some embodiments, the hardware security module 130 is implemented in a secure enclave 405 of the HSVP system 400. The secure enclave 405 may represent a dedicated secure subsystem isolated from a non-secured environment of hardware elements and/or software of the HSVP system 400. In some embodiments, one or more aspects of the hardware security module 130 are performed in a trusted execution environment (TEE) 421 (e.g., such as may be implemented within supervisory controller 420 or as a separated component) of the HSVP system 400.

The image sensor(s) 105 is coupled to, and communicates with, the hardware security module 130 through one or more data buses 412. For example, the data buses 412 may include a mobile industry processor interface (MIPI) protocol channel, an Inter-Integrated Circuit (I²C) protocol channel, and/ or other type of data bus. A MIPI protocol channel may provide a high-speed serial interface for the data bus(es) 412 to transport raw video image data 110 produced by the image sensor(s) 105 to the hardware security module 130, and may further be used at least once during a video session to communicate the hardware device ID 112 of the trusted image data bundle 116 to the hardware security module 130. An I²C protocol channel is a relatively low-speed half-duplex serial interface, and may be used to communicate an authentication challenge from the hardware security module 130 to the image sensor(s) 105 (e.g., to pass a public key to the image sensor(s) 105 during a key exchange). In some embodiments, the image sensor(s) 105, data bus(es) 412, and/or hardware security module 130 may be integrated together on a shared circuit board, and/or integrated together within a common integrated circuit package. In some embodiments, the HSVP system 400 may be implemented at least in part using a field programmable gate array (FPGA) and/or an application-specific integrated circuit (ASIC).

As shown in FIG. 4, the hardware security module 130 may comprise a first controller, referred to herein as supervisor controller 420, that executes code to perform one or more of the functions of the hardware security module 130 described herein. For example, one or more aspects of the attestation package assembly function 132, the ISP video image processing stages 134, and/or the digital signature engine 140 may be performed based on code executed by the supervisor controller 420. In some embodiments, the supervisor controller 420 may include one or more processing resources such as, but not limited to, a central processing unit (CPU) or microprocessor, graphics processing unit (GPU), and/or neural processing unit (NPU). Within the secure enclave 405, the hardware security module 130 may further comprise a secure memory 422 accessible by the controller 420 via a memory management unit (MMU) 424. The MMU 424 protects access to the secure memory 422 such that the controller 420 may access the secure memory 422, but no other components external to the hardware security module 130 can access the secure memory 422 or otherwise have visibility to secure memory 422. In some embodiments, the secure memory 422 may include the signature key data store 142 providing the signature key 114 and other keys used by the hardware security module 130. In some embodiments, the secure memory 422 may at least in part be implemented using an electronic fuse (eFuse) and/or write once read many (WORM) type of memory to record the public key of image sensor(s) 105 (e.g., during assembly when the pairing takes place). From that point forward, the specific hardware security module 130 and image sensor(s) 105 are paired, and the hardware security module 130 will only accept image data 110 generated by the image sensor(s) 105 to which it is paired.

As also shown in FIG. 4, the one or more ISP video image processing stages 134 may include one or more image adjustment stages 430, at least one video encoder 432 and/or a feature classification model 434. The image adjustment stages 430 may comprise an image data pipeline of one or more filters and/or other algorithms for adjusting aspects of the video image data 110 such as, but not limited to, CFA/CFM mapping, demosaicing, white balance, noise reduction, tone mapping, color correction, image scaling, and/or other image adjustments. As discussed herein, the hardware security module 130 may generate an image data pipeline description supplemental attestation 136 providing an indication of each of the adjustments performed by the image adjustment stages 430. In some embodiments, the ISP video image processing stages 134 includes at least one video encoder 432 to encode the output of the ISP video image processing stages 134 for distribution. The video encoder 432 may apply a video codec for streaming or distribution of the adjusted video data, such as but not limited to High-Efficiency Video Coding (HEVC, H.265), Advanced Video Coding (H.264), AOMedia Video 1 (AV1), a Moving Picture Experts Group (MPEG) codec, or other video codec.

In some embodiments, the feature classification model 434 may comprise, for example, a machine learning model implemented using a neural network. The feature classification model 434 may be trained to detect, extract, and/or classify one or more features from the video image data 110 and assign one or more classifications to those features, which are included in the representation of the image data 135 output from the ISP video image processing stages 134. As an example, the feature classification model 434 may generate an output representing the video image data 110 that comprises a classification that indicates how many people are present in the scene captured by video image data 110, an identification of one or more objects present in the scene, and/or inferences of one or more actions or activities taking place in the scene based on the behaviors, positions, and/or movement of people and/or objects appearing in the video image data 110. For privacy-sensitive context scenarios, one or more outputs from the feature classification model 434 provide a real-time indication of events occurring in the video image data 110 as-captured. The output 135 from the ISP video image processing stages 134 may include such feature classification inferred by the feature classification model 434, without further including video images that could be used to identify the people involved. In some embodiments, the feature classification model 434 may generate tokens representing people, objects, and/or events extracted from the video image data 110, so that a machine vision-based rendering of a scene captured by the video image data 110 may be generated using generic computer-synthesized representations of those features in the rendering. In some embodiments, the attestation package may be generated to include the feature classification model 434-produced inferences (e.g., the tokenizations of one or more features) without including the video image data 110. The attestation package assembly function 132 may include at least one of the attestations in the attestation package 138 that attests to the fact that the attestation package 138 does not include the video image footage. In some embodiments, the image data pipeline description may define a supplemental attestation element included in the attestation package 138 that documents the involvement of the feature classification model 434 and/or attests to the specific machine learning models and/or algorithms that were used to produce inferences and/or classifications included in the output 135 from the ISP video image processing stages 134. In some embodiments, the supplemental controller 450 may provide supplemental data such as image classification models, and/or additional executable programs to be executed by supervisor controller 420 as part of the ISP video image processing stages 134, which may also generate supplemental attestations. In this case, the attestation package assembly function 132 would include attestations fully specifying the executed programs, any supplemental data, and any supplemental attestations. In some embodiments, these specific attestations would not be eligible for redaction during selective disclosure. In some embodiments, the supplemental controller 450 may use whitelisting, signature checks, sandboxing, isolation, or other controls to limit the executable programs it may accept, or the executable program's scope of operation. For example, the classifications performed by the feature classification model 434 may be configurable and/or augmented based on classification criteria, image classification models, and/or additional executable programs provided through the supplemental controller 450, to infer the presence of one or more features of interest and include those classifications in the output 135. For example, where the camera is used for performing wildlife research, the supplemental data may include an algorithm to classify and/or count when specific sets of species are observed from the video image data 110. Additional supplemental attestations may be generated attesting to use of the supplemental data in producing the classifications and/or counting of those features (the specific sets of species) that are present in the output 135.

In some embodiments, the video image data 110 may be received by the hardware security module 130 (e.g., via the one or more data buses 412) where the MMU 424 may save the initial data to the secure memory 422. The hardware device ID 112 and/or signature key 114 associated with the current video session may likewise be saved to the secure memory 422. The supervisor controller 420 may instruct one or more components of the ISP video image processing stages 134 to access the video image data 110 from the secure memory 422 (e.g., using MMU 424) to perform one or more operations and/or image adjustments as discussed herein, to produce the representation of the image data 135—which may be output and saved to the secure memory 422 using the MMU 424. The attestation package assembly function 132 may then generate in the secure memory 422, the attestation package 138 comprising the attestations associated with the representation of the image data 135. As discussed herein, the attestations may include one or more supplemental attestation elements 136 that are internally generated by the hardware security module 130 itself. For example, the hardware security module 130 may generate the image data pipeline description, one or more hash digests, and/or other supplemental attestation elements 136 that represent one or more facts associated with the video image data 110 that may be used to varying degrees to evidence the authenticity of the representation of video image data 135 included in a set of attested media data 146.

Other supplemental attestation elements 136 may be derived based on data obtained by the hardware security module 130 from sources external to the hardware security module 130. For example, the HSVP system 400 may include, or otherwise be coupled to, one or more upstream components external to the secure enclave 405. More specifically, the HSVP system 400 may include a second controller, referred to herein as supplemental controller 450. In some embodiments, the supplemental controller 450 may include one or more processing resources such as, but not limited to, a central processing unit (CPU) or microprocessor, graphics processing unit (GPU), and/or neural processing unit (NPU).

As shown in FIG. 4, the supplemental controller 450 may be coupled to an MMU 452 that provides access to a memory 456 that is outside the secure enclave 405. The supplemental controller 450 may execute an operating system (OS) and one or more other applications that perform one or more functions or services for the HSVP system 400 that may not need the degree of security provided within the secure enclave 405. In some embodiments, the supplemental controller 450 may receive data from one or more external supplemental attestation element sources 440, such as, but not limited to, sensor data representing measurements of environmental parameters, time data from clocks, location data from navigation receivers (e.g., position data from a global navigation satellite system, and/or pseudo-random-noise (PRN) codes), encryption keys, and/or data received from a blockchain and/or other blockchain-based technology. The supplemental controller 450 may forward or otherwise communicate the data from the one or more external supplemental attestation element sources 440 to the MMU 452 to save as external supplemental attestation elements 454 in memory 456. The supervisor controller 420 may then access the memory 456 via MMU 452 to retrieve one or more of the external supplemental attestation elements 454 for inclusion as supplemental attestation elements 136 in the attestation package 138. In some embodiments, external supplemental attestation elements 454 may be timestamped or otherwise include information that may be used by the attestation package assembly function 132 to correlate the external supplemental attestation elements 454 with the video image data 110. In the case that supplemental attestation elements originate from sensors or other components capable of cryptographically authenticating their identity and output content to the HSVP, then additional attestation elements may be included describing the sensor identity and its authentication in accordance with some embodiments.

In some embodiments, the supplemental controller 450 may communicate with the supervisor controller 420 to instruct the attestation package assembly function 132 as to which supplemental attestation elements 136 are to be included in an attestation package 138. The supplemental controller 450 may also, or instead, instruct the supervisor controller 420 to configure the ISP video image processing stages 134 with respect to which image adjustments, video encoding, and/or feature classification operations are to be used to generate the output 135 representing the processed video image data 110. Such instructions may be based on user inputs or preferences received by the supplemental controller 450 based on inputs from a user (e.g., via a control panel and/or other user interface provided by the HSVP system 400).

In some embodiments, the HSVP system 400 is designed not only to include externally-sourced data items from a blockchain source as attestations within the attested media data bundle 146, but also to prepare and output transactions for submission to a remote blockchain. Given that the HSVP system 400 operates as a low-level hardware component incapable of initiating network activity, it may rely on a higher-level component, such as the operating system of the computing device (e.g., computing device 700 of FIG. 7) incorporating the HSVP system 400, to facilitate the generation and submission of such blockchain transactions. The higher-level component can provide the HSVP system 400 with all necessary inputs for the blockchain transaction, excluding secret key material and the HSVP's own output metadata. Subsequently, the higher-level component may conduct the network activity required to submit (e.g., via the Internet) the prepared transaction to the blockchain, as one of ordinary skill may appreciate.

Content submitted to a blockchain may include, for example, a precommitment of the HSVP system 400 output, such as the root hash of the attested media data 146 for an output segment or a hash of concatenated output hashes from several previous output segments in sequence. More specifically, and by way of non-limiting example, if output segments are generated every minute, a precommitment about the attested media data 146 from the previous ten minutes of video may include a hash of the root hashes of the last ten output segments.

Submitting a precommitment to a blockchain network (i.e., via a blockchain transaction) can provide robust evidence that the data was created no later than the submission time. Similarly, including externally-sourced blockchain data attestations, such as the hash at a particular block height, as inputs among the attested media data 146 can provide strong evidence that the data was created no earlier than the time the externally-sourced data became part of the blockchain. Together, such data points may offer verifiable evidence of the time bounds within which the attested media data 146 was captured.

Additionally, submitting a precommitment to a blockchain may ensure the proof logic remains valid even if the capturing device is not connected to the Internet at the time of data capture. When the capturing device hosting the HSVP system 400 eventually connects to the Internet and submits data (e.g., the precommitment) to the blockchain, such data can provide strong evidence that the attested media data 146 was created at or before the time of transmission.

By employing a selective disclosure scheme as previously described, submitting a precommitment to a blockchain at the time of content creation does not reveal additional information about the content. The content may be selectively disclosed later and validated against the blockchain submission, serving as a form of precommitment. It is further contemplated that numerous other content metadata items may similarly be output to a blockchain. Examples may include, by way of non-limiting example, observed QR codes, recognized known persons, the number of detected objects (e.g., humans or vehicles) in a scene, or temperature readings from an infrared image sensor, among other things.

Figure 5:
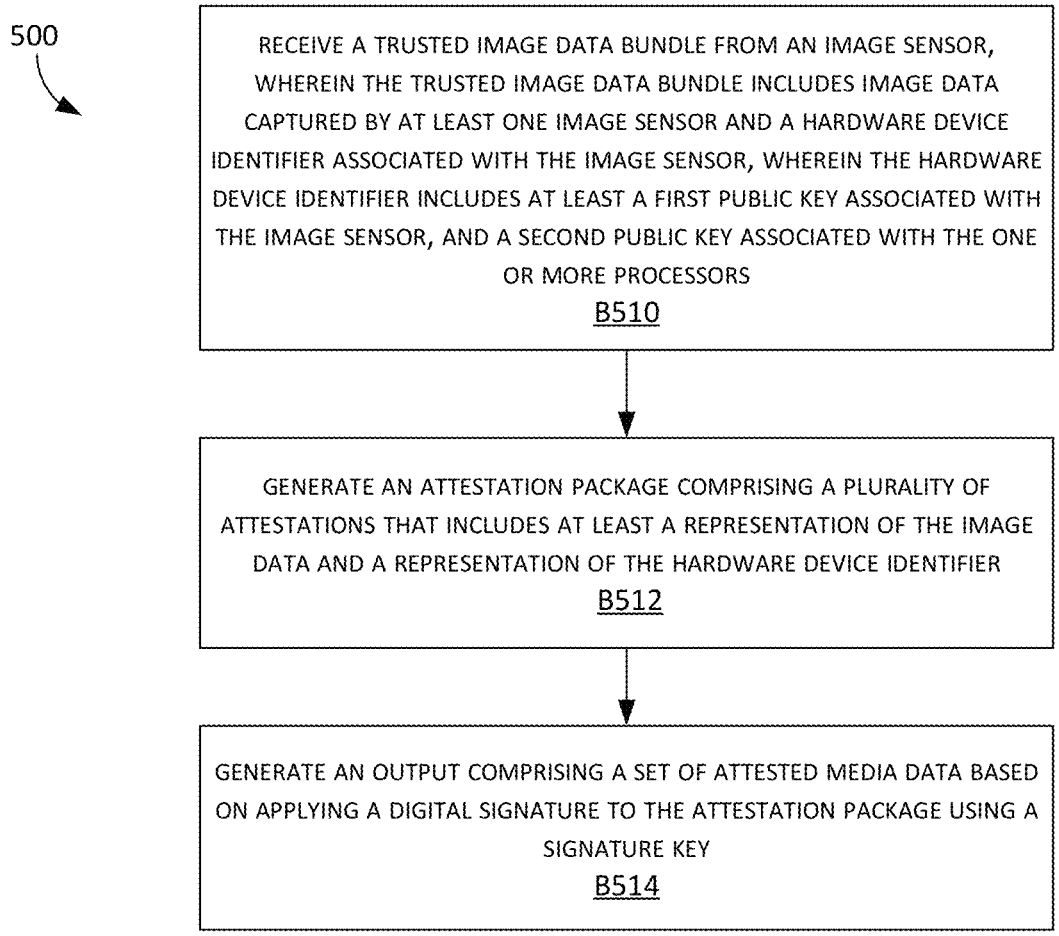
FIG. 5 is a flowchart illustrating an example method for attestation-based video image processing, in accordance with embodiments of the present disclosure.

Referring now to FIG. 5, a flowchart illustrating a method 500 for attestation-based video image processing is provided, in accordance with embodiments of the present disclosure. It should be understood that the features and elements described herein with respect to the method 500 of FIG. 5 can be used in conjunction with, in combination with, or substituted for elements of any of the other embodiments discussed herein and vice versa. Further, it should be understood that the functions, structures, and other descriptions of elements for embodiments described in FIG. 5 can apply to like or similarly named or described elements across any of the figures and/or embodiments described herein and vice versa. In some embodiments, elements of method 500 are implemented utilizing elements of attestation-based video image processing system 100, hardware security module 130, and/or HSVP system 400 disclosed herein, or other processing device implementing embodiments of the present disclosure.

Method 500, at B510, includes receiving a trusted image data bundle from an image sensor, wherein the trusted image data bundle includes image data captured by at least one image sensor and a hardware device identifier associated with the image sensor, wherein the hardware device identifier includes at least a first public key associated with the image sensor, and a second public key associated with the one or more processors. As discussed with respect to FIG. 1, in some embodiments, when the image sensor(s) 105 outputs video image data 110 to the hardware security module 130, the video image data 110 is comprised within a trusted image data bundle 116 that further includes the hardware device ID 112 (which may include a public key associated with the image sensor(s) 105 and the hardware security module 130). The combination of the video image data 110 with the hardware device ID 112 being received from an image sensor(s) 105 that is properly paired and authenticated with the hardware security module 130 indicates to the hardware security module 130 that the trusted image data bundle 116 is being received from the image sensor(s) 105 as opposed to another (untrusted) source.

Method 500, at B512, generates an attestation package comprising a plurality of attestations that includes at least a representation of the image data and a representation of the hardware device identifier. In some embodiments, the attestation package may further be generated to include one or more supplemental attestation elements to the attestation package—such as supplemental attestation elements that represent one or more facts associated with the image data. Example supplemental attestation elements may include, but are not limited to, time data, location data, satellite navigation system data, a pseudo-random-noise (PRN) code, an asymmetric key, data received from a blockchain, and/or the digest output of one or more hash functions. In some embodiments, the attestation package may include an image data pipeline description that identifies one or more processes applied to the image data to produce the representation of the image data. As discussed above, the method may be performed using a hardware security module 130 as described with respect to FIGS. 1 through 4. The hardware security module 130 may implement an ISP pipeline 144 that includes one or more ISP video image processing stages 134 and an attestation package assembly function 132. Based on the trusted image data bundle 116 from the image sensor(s) 105, the ISP pipeline 144 may apply ISP video image processing stages 134 to the video image data 110 (e.g., image adjustments, video encoding, feature classifications, etc.) to produce an output 135 representing the processed video image data to the attestation package assembly function 132. The output 135 from the ISP video image processing stages 134 may include an adjusted version of the video image data 110 (e.g., adjusted for demosaicing, color corrections, white balance, or other image processing parameters) and encoded using a video codec for streaming or distribution, such as but not limited to High-Efficiency Video Coding (HEVC, H.265), Advanced Video Coding (H.264), AOMedia Video 1 (AV1), a Moving Picture Experts Group (MPEG) codec, or other video codec. The output 135 from the ISP video image processing stages 134 may include other data representing the processed video image data, such as a machine vision-based rendering of a scene captured by the image sensor and/or one or more classifications inferred from features detected from the video image data.

In some embodiments, based on the image data, the method may include generating the representation of the image data to comprise at least one of: encoded video data based on the image data; a computer vision rendering of the image data based at least on one or more features extracted from the image data by one or more machine learning models; and/or one or more classifications characterizing the one or more features extracted from the image data by the one or more machine learning models. When the representation of the image data does not include the video data, the plurality of attestations comprises at least one attestation confirming that the representation of the image data does not include the encoded video data. For example, in some scenarios it may be preferable to publish select information about the video image data 110 without supplying the actual video content. For such cases, the output 135 may include image classifications without outputting the actual video content. Omitting actual video content from the attested media data 146 could make use of cameras acceptable in cases where it would otherwise not be appropriate, for example due to privacy concerns. For example, in private spaces such as bathrooms, attested media data 146 could indicate—without outputting the actual video content—whether visitors wash their hands before leaving (which may be used to generate an audible reminder), and/or detection of actives classified as illegal and/or inappropriate.

Method 500, at B514, includes generating an output comprising a set of attested media data based on applying a digital signature to the attestation package using a signature key. The attested media data may comprise a digitally signed data structure that includes one or more attestations that evidence the authenticity of information about and/or derived from video image data 110. In some embodiments, the method may further include applying a selective disclosure redaction of one or more of the plurality of attestations to generate a distribution version of the attested media data for presentation by a presentation application. As described with respect to FIG. 3, the presentation application may validate the distribution version of the attested media data using one or more validation resources based at least on the signature key.

In some use cases, a set of image sensors (e.g., such as image sensor(s) 105) may be used in groups. For example one image sensor may be oriented to show an overview of a playing field, while other cameras show closer views of specific bases, goals, players, etc. The use of multiple image sensors might also provide redundancy in the event of partial hardware failure. For example, a first image sensor might capture an event visually, but have damaged or otherwise blocked audio capture. The audio from another nearby image sensor might be referenced, even if that camera did not have field of view to visually cover the event in question. Traditionally the relationship between multiple image sensors providing combined coverage of a space would be readily apparent to those viewing the audio and video, because of similar or overlapping content. Something that might not be easily seen in one image sensor may be captured by the video image data of another image sensor view, without the viewer needing to make a new and independent assessment of the probability of one of the image sensors providing fake or manipulated content.

Figure 6:
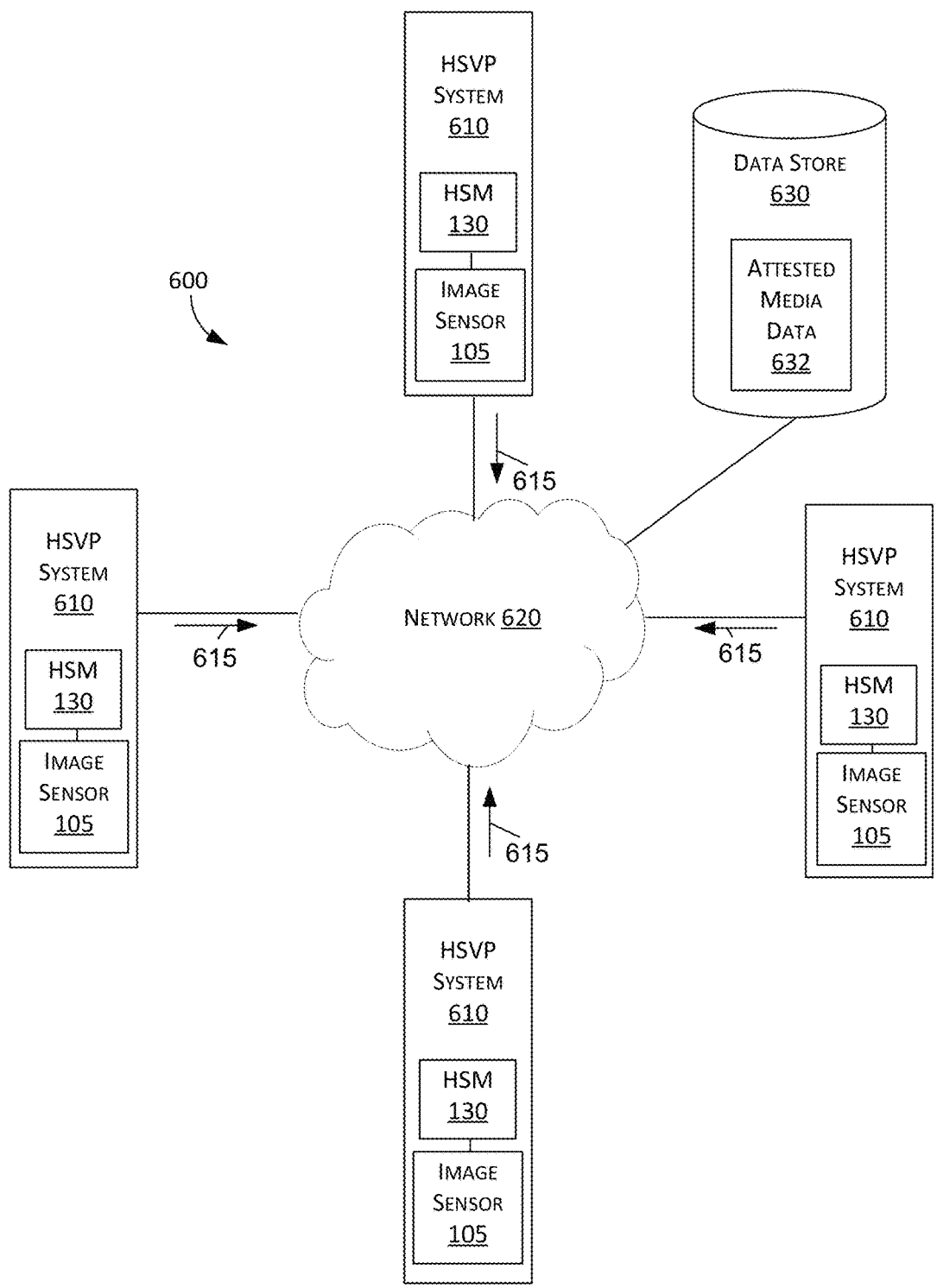
FIG. 6 is a diagram illustrating a system comprising a plurality of HSVP systems, in accordance with embodiments of the present disclosure.

Accordingly, in some embodiments as shown in FIG. 6, a system 600 comprising a plurality of HSVP systems 610 (such as HSVP system 400), as discussed herein, may be deployed cooperatively and connected via a network 620 (e.g., a local wired or wireless network) such that the cryptographic attestations from each individual HSVP system 610 may be securely associated together with cryptographic attestations from one or more other individual HSVP systems 610 to provide HSVP peering. For example, hardware security modules 130 may generate beacons 615 to upstream hardware and/or operating systems within an HSVP system 610, such as supplemental controller 450. These beacons 615 may be transmitted via network 620 to other HSVP systems 610 by the upstream hardware and/or operating systems. Beacons 615 may be enabled or disabled, and in some embodiments keyed such that other HSVP systems 610 sharing the same key will peer together, and those that do not share the same key will ignore each other. The operating system of an HSVP system 610 may also (e.g., with rate limiting) forward beacons 615 received externally from other devices to the local hardware security module 130. The hardware security modules 130 may then give replies to recently received beacons for the operating system to deliver/forward, and also forward replies. In this way, one HSVP system 610 may perform a key exchange (e.g., combining a pre-shared key of a set) and authenticate one or more peer HSVP systems 610—and based on the authentication, open a channel over which each HSVP system 610 may provide a key to peer HSVP systems 610 to decrypt a portion of its beacons 615. This information may include, for example, a root hash of a most recently produced segment from a current video session. In some embodiments, an HSVP system 610 may perform a protocol to test for a shortest network round trip time between itself and an HSVP system peer 610, which may be used as an indication of proximity. The indication of peer proximity may be included in the attested media data 146. In some embodiments, attested media data 632 generated by HSVP systems 610 of the system 600 may be aggregated together (e.g., and correlated with respect to time) and saved to a data store 630.

The following paragraphs describe various potential use cases for attested media data 146 output from a hardware security module 130, produced from video image data 110 from a trusted image sensor(s) 105, as described in the various embodiments disclosed herein.

Surveillance cameras with privacy-aware use cases: The use of surveillance cameras by governments and private businesses globally is increasingly pervasive. At the same time, individuals' awareness of their loss of privacy and their resulting discomfort with video surveillance are also growing. The attested media data 146 may be used to prove that a camera device was only used to output characterization and/or classification data (e.g., as inferred from a machine learning algorithm) such as the number of persons entering a venue—and that individuals' biometric information, such as their face and gait, was not included in the attested media data 146. In some embodiments, the feature classification model 434 may be coupled to a registry of biometric profiles and produce the representation of the image data 135 such that faces and/or features of registered persons are blurred out, but video images of unrecognized individuals are included in the attested media data 146. In some embodiments, a registry of biometric profiles may be used to produce an alert or warning when known suspicious persons are detected by a machine learning algorithm, where the representation of the image data 135 is generated such that faces and/or features of persons other than the known suspicious persons are blurred out, but video images of suspicious individuals are included in the attested media data 146. Such a system may provide for a degree of privacy from surveillance for authorized individuals while still allowing for meaningful surveillance monitoring for security purposes. In some embodiments, using a registry of biometric profiles may be used to preserve privacy for high-profile visitors to sensitive locations while still maintaining security, as individuals with a registered biometric profile are blurred out from recorded video while unrecognized individuals have their images fully recorded in the attested media data 146. This ensures that those without sufficient security clearance, selective disclosure (as discussed above) may be applied to provide a distribution version of the attested media data 146 for use by those who do not need to have direct access to these visitors' data (e.g., security guards or anyone with access to the room with camera feeds), but another output of the attested media data 146 where un-blurred video data is included may be generated at the same time, and encrypted to an externally provided public key, and later decrypted by the external key holder on an as-needed basis (e.g., in a security situation). In this way, privacy for individuals may be preserved to protect citizens from over-surveillance.

Sensitive Facilities: In spaces inside or near organizations performing services of a sensitive nature (e.g., health clinics), users, employees and/or service providers may prefer to avoid being unduly recorded. In such areas, an organization can still operate surveillance cameras for security purposes without jeopardizing the privacy of individuals.

News production: For some use cases, attested media data 146 may be produced from a hardware security module 130 and/or HSVP system 400 used in professional and consumer digital cameras in order to prove that a photo and/or video image data was taken on a real camera, instead of being digitally created. In addition, supplemental attestation elements 136 captured during a video session can be used to attest to the time and place of the image data.

Military & law enforcement: In some use cases, aerial drones can be equipped to produce attested media data 146 so as to prove that a drone strike hit a planned target, without needing to release raw footage that might compromise mission security. Similarly, satellite imagery can be released as attested media data 146 to evidence developments to facilities or terrain in sensitive area, or alternatively to prove that no material changes were made, without having to disclose the full images. In some implementations, police body cameras can be equipped with an HSVP system to produce attested media data 146 that more credibly documents details of events that occur during police responses.

Voting: In some use cases, using a quick-response (QR)-code recognition capability, voting booths or machines can be equipped with cameras that produce attested media data 146 that can verify when a person's QR code was seen by an image sensor. This may or may not be combined with: (a) time- and location-based supplemental attestations, (b) machine vision to identify an individual's biometrics (thus identifying an individual or just their visible characteristics), and/or (c) proof that the holder of the QR code belongs to a group that is entitled to vote and has not previously voted, without disclosing the identity of the voter (e.g., using zero-knowledge technology). Alternatively, voting booths or machines can be equipped with cameras whose where the output content does not include biometrics, instead only outputting metadata indicating that a person walked into the booth, stayed for some period, and held the ballot paper up to the camera with their selection indicated. A hash of this segment (or a batch of segments) can be output (i.e., submitted) to a blockchain, enabling permissioned or even public validation of each vote later. Since the data can only have been generated at the time of submission or earlier, it is impossible for perpetrators to credibly submit doctored or additional ballots after vote stations close.

Industrial: In some use cases, factories undergoing inspections by a standards body can facilitate remote video inspection using attested media data 146, while being able to redact proprietary elements of the production process (e.g., using selective disclosure). This use case may include inspections related, for example, to labor safety, food safety, climate change, animal welfare, and other socially important topics. Factories of high-value handmade products (e.g., luxury bags and apparel) can use redacted distribution versions of attested media data 146 as video proof that their products were handmade rather than factory- or robot-made.

Retail: In some use cases, retail establishments that use vision-automated checkout systems can use attested media data 146 to attest that during vision-based automated shopping and payment transactions, users' biometrics are not being captured and stored. Instead, only the processed results of machine learning algorithms made for the checkout process are included in the attested media data 146.

Alternatively, checkout systems that use biometrics scanning to complete transactions can use attested media data 146 to attest that the user's raw biometrics were not stored or transmitted, but just used to validate payment credentials.

Social Media: In some use cases, consumer devices such as smartphones, webcams, and augmented/virtual reality headsets can be outfitted with the systems described herein to produce attested media data 146 so that influencers, citizen journalists, and regular consumers can assure their audiences of the authenticity of their video posts (e.g., that the content producer's device was used to record video at a verifiable time and location). In some embodiments, metadata obtained from network-accessed or on-device blockchain data can be used to time- and/or location-stamp the video data. For example, supplemental attestation elements 136 may be derived from network-accessed blockchain data that can be pulled from blockchain service providers while on-device blockchain data can be pulled from lightweight blockchain nodes run locally on the consumer devices. For privacy and safety, selective disclosure may be used to verifiably redact certain elements appearing in the video image data 110 (e.g., faces of children) without losing the ability to validate the attested media data 146. In some embodiments, a smartphone, webcam, and/or augmented/virtual reality headset may be linked to a decentralized identity (such as a blockchain address or account, together described as a blockchain identity), such that a content originator can prove that they created the content. The linkage to the decentralized identity could be performed by a user with full access to the blockchain identity (such as by having access to a private key), but not others.

Test-taking integrity: at-home tests and assignments are prone to cheating due in part to artificial intelligence technologies, while in-person invigilation is at odds with increasingly digital school and work settings. Instead, test takers could take a video of themselves responding to an assignment in real-time, sending the video to the test administrators and submitting a hash of the video image data to the blockchain. The HSVP on the device guarantees that the video was captured and not generated; the data on the blockchain validates that the video was captured before the test deadline (and before the release of test answers).

Insurance: As another use case, attested media data 146 produced by cameras installed in and around property (residential, commercial, or public) and in cars can be used for insurance claims purposes to prove that the events recorded transpired as recorded (video was authentic) and were not tampered with (video has integrity). Time- and location-stamps may also be recorded from external or on-device blockchain or other verifiable sources to establish supplemental attestation elements 136. For residential cameras, zero-knowledge-based technologies may be used to safely redact or blur out certain actors (e.g., children) or parts of actors (e.g., faces of children) from attested media data 146 without losing the ability to support an insurance claim.

Communications & safety: In some use cases, attested media data 146 may combat the rise of deepfake scams defrauding consumers and businesses by providing a way by which video communications can be proved authentic.

Future transportation and delivery modes: Self-driving cars and drone deliveries are examples of use cases that use video image data from many on-device video cameras for operational and safety reasons. However, the public may be uncomfortable with such ubiquitous video monitoring. As such, the ability of such a machine to produce attested media data 146 provides a way to prove that the cameras are collecting structured image data and feeding it to processing algorithms, rather than collecting and/or transmitting raw video image data.

Gaming or worker/robot management applications which require attesting to using a camera at a specific time, place, or being at a certain proximity/distance to other users: In the gaming context, an augmented reality game like Pokemon Go is such an example. In the worker or robot context, such cameras can be used to ensure that workers and robots and safely distanced and efficiently distributed across a factory floor. These applications may also require capturing specific objects in the image data, using a machine learning component to ascertain the identity of those objects; those objects may be other users/people, robots, or general objects. These applications may require using AR/VR headsets, body cameras, or regular gaming devices like computers, mobile phones or console devices.

Internet-of-Things ("IoT"): In some use cases, smart devices are embedded with software and sensors that may be used for the purpose of connecting and exchanging data with other devices and systems (e.g., over the Internet). Such smart devices can use attested media data 146 in order to authenticate themselves, making them less vulnerable to compromise by remote bad actors (e.g., hackers). In addition, attested media data 146 enables IoT devices to attest to the integrity of the data they collect and transmit. Devices included in this IoT category include, but are not limited to, home and industrial appliances, as well as robots, drones and other devices used for purposes such as delivery, transport, security, surveillance, and assistance with human tasks. Moreover, data transmitted to network servers by IoT devices can be validated as authentic, while still addressing privacy concerns by omitting personal and/or sensitive data.

Referring to FIG. 7, a diagram is depicted of an exemplary computing environment suitable for use in implementations of the present disclosure. In particular, the exemplary computer environment is shown and designated generally as computing device 700. Computing device 700 is but one example of a suitable computing environment and is not intended to suggest any limitation as to the scope of use or functionality of the embodiments described herein, and nor should computing device 700 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 7, computing device 700 includes bus 710 that directly or indirectly couples the following devices: memory component 712, one or more processors 714, one or more presentation components 716, input/output (I/O) ports 718, I/O components 720, power supply 722, and radio 724. Bus 710 represents what may be one or more buses (such as an address bus, data bus, or combination thereof). The devices of FIG. 7 are shown with lines for the sake of clarity. However, it should be understood that the functions performed by one or more components of the computing device 700 may be combined or distributed amongst the various components. For example, a presentation component such as a display device may be one of I/O components 720. In some embodiments, one or more functions of a hardware security module 130 and/or HSVP system 400 discussed herein may be executed at least in part by computing device 700. The processors 714 of computing device 700 may include a memory. The present disclosure hereof recognizes that such is the nature of the art, and reiterates that FIG. 7 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. For example, applications for hardware security module 130, HSVP system 400, and/or video presentation application 352 may be stored in a memory comprising such computer-readable media. Computer-readable media can be any available media that can be accessed by computing device 700 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules, or other data.

Computer storage media includes non-transient random access memory (RAM), read-only memory (ROM), electrically erasable programmable read-only memory (EEPROM), flash memory or other memory technology, CD-ROM, digital versatile disks (DVDs) or other optical disk storage, magnetic cassettes, magnetic tape, magnetic disk storage, or other magnetic storage devices. Computer storage media and computer-readable media do not comprise a propagated data signal or signals per se.

Memory 712 includes computer storage media in the form of volatile and/or non-volatile memory. Memory 712 may be removable, non-removable, or a combination thereof. Exemplary memory includes solid-state memory, hard drives, optical-disc drives, etc. Computing device 700 includes one or more processors 714 that read data from various entities such as bus 710, memory 712, or I/O components 720. In some embodiments, the controller 420 is implemented by one or more of the processors 714. As such, processors 714 may include one or more processing resources such as, but not limited to, a central processing unit (CPU) or microprocessor, graphics processing unit (GPU), and/or neural processing unit (NPU).

One or more presentation components 716 presents data indications to a person or other device. For example, one or more renderings based on the representation of video image data 135 may be presented via the one or more presentation components 716. Exemplary one or more presentation components 716 include a display device, speaker, printing component, vibrating component, etc. I/O ports 718 allow computing device 700 to be logically coupled to other devices including I/O components 720, some of which may be built into computing device 700. In some embodiments I/O components 720 include a network interface card (NIC) for coupling the computing device to a wired and/or wireless network. Illustrative I/O components 720 may include a microphone, joystick, game pad, satellite dish, scanner, printer, wireless device, etc. Radio(s) 724 represents a radio that facilitates communication with a wireless telecommunications network. For example, radio(s) 724 may be used to establish communications with network 302. Illustrative wireless telecommunications technologies include Wi-Fi, Bluetooth, Near Field Communications (NFC), 4G LTE cellular, 5G cellular, and the like.

Figure 8:
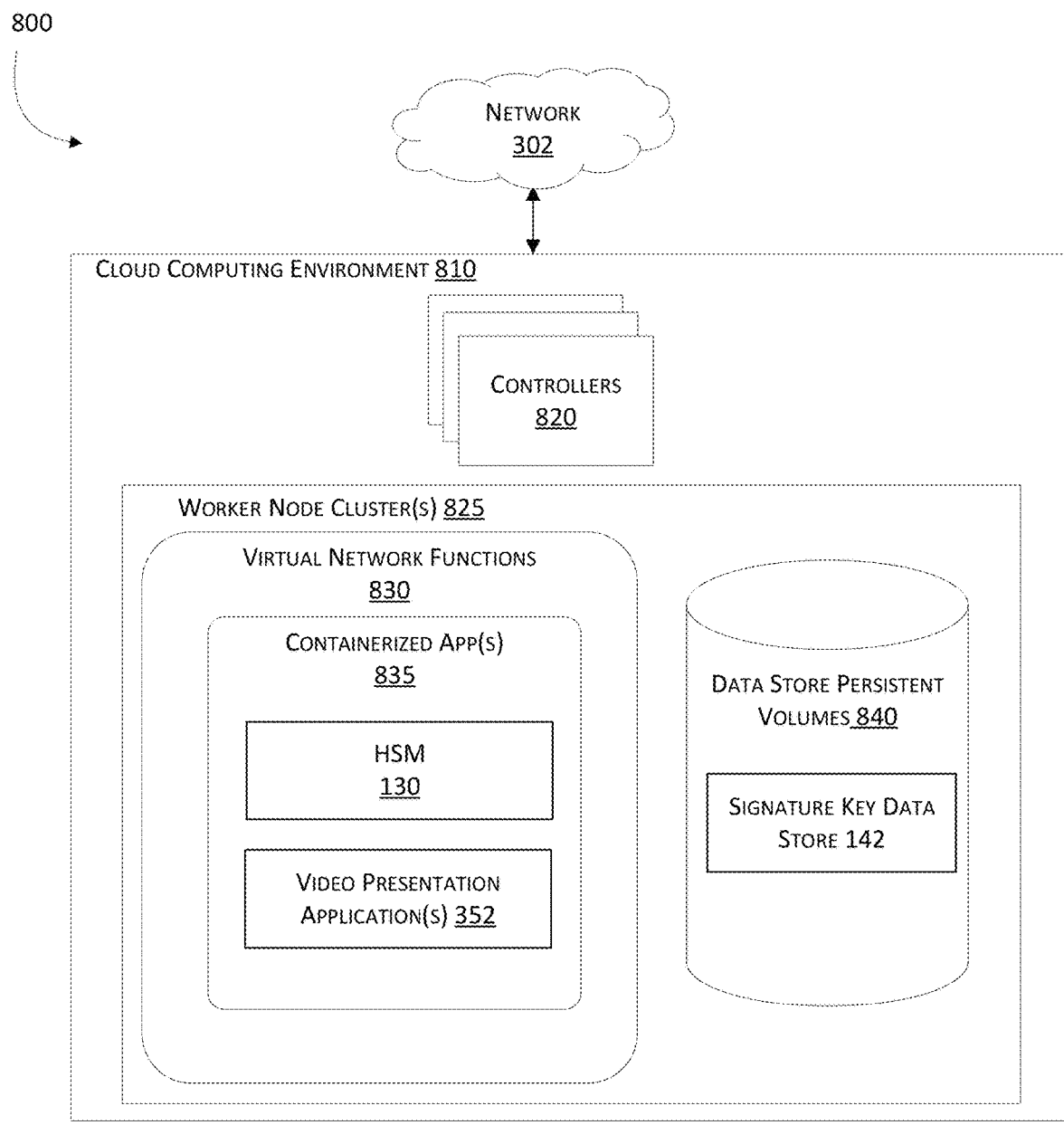
FIG. 8 is a diagram of an exemplary cloud computing environment, in accordance with embodiments of the present disclosure.

Referring to FIG. 8, a diagram is depicted generally at 800 of an exemplary cloud computing environment 810 for implementing one or more aspects of an architecture for hardware security module 130, HSVP system 400, and/or video presentation application 352, as implemented by the systems and methods described herein. Cloud computing environment 810 is but one example of a suitable cloud computing environment and is not intended to suggest any limitation as to the scope of use or functionality of the embodiments presented herein, and nor should cloud computing environment 810 be interpreted as having any dependency or requirement relating to any one or combination of components illustrated. In some embodiments, the cloud computing environment 810 is coupled to a network, such as network 302.

Cloud computing environment 810 includes one or more controllers 820 comprising one or more processors and memory. The controllers 820 may comprise servers of a data center. In some embodiments, the controllers 820 are programmed to execute code to implement at least one or more aspects of the hardware security module 130, HSVP system 400, and/or video presentation application 352. For example, in one embodiment applications for hardware security module 130, and/or video presentation application 352, as discussed herein, may be implemented as containerized applications 835 of one or more virtual network functions (VNFs) 830 running on a worker node cluster 825 established by the controllers 820.

The cluster of worker nodes 825 may include one or more orchestrated Kubernetes (K8s) pods that realize one or more containerized applications 835. In other embodiments, another orchestration system may be used. For example, the worker nodes 825 may use lightweight Kubernetes (K3s) pods, Docker Swarm instances, and/or other orchestration tools. In some embodiments, one or more elements of the hardware security module 130, HSVP system 400, and/or video presentation application 352 may be implemented by, or coupled to, the controllers 820 of the cloud computing environment 810 by network 302. In some embodiments, one or more elements of a signature key data store 142 may be implemented at least in part using one or more data store persistent volumes 840 in the cloud computing environment 810.

As used herein, the terms "function," "module," "server," "engine," "controller," and "stages" are used to describe computer processing components and/or one or more computer-executable services being executed on one or more computer processing components. In the context of this disclosure, such terms used in this manner would be understood by one skilled in the art to refer to specific hardware and/or computer-implemented elements and not used as nonce words or intended to invoke 35 U.S.C. 112(f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings, which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A device comprising:
   at least one image sensor associated with a hardware device identifier;
   a hardware security module coupled to the at least one image sensor by at least one data bus, the hardware security module comprising a secure enclave that includes:
   a first controller;
   a memory management unit coupled to a secure memory within the secure enclave of the hardware security module, wherein the first controller communicates with the secure memory using the memory management unit; and
   a digital signature engine;
   wherein the hardware security module, using the memory management unit, stores to the secure memory a trusted image data bundle received from the at least one image sensor via the at least one data bus, wherein the trusted image data bundle includes image data captured by the at least one image sensor and the hardware device identifier;
   wherein the first controller is configured to generate within the secure memory an attestation package comprising at least a representation of the image data and a representation of the hardware device identifier;
   wherein the digital signature engine is configured to apply a cryptographic signature to the attestation package using a signature key, wherein the signature key is associated with a video session comprising a video image sequence of the image data and when the video session is started, a zero-knowledge proof is created showing that the signature key is signed by a key in a published database of authentic hardware keys, without revealing identifying information associated with the device; and
   wherein the hardware security module is configured to output a set of attested media data based on the attestation package.

2. The device of claim 1, wherein the first controller adds one or more supplemental attestation elements to the attestation package, wherein the one or more supplemental attestation elements represent one or more facts associated with the image data.

3. The device of claim 2, wherein the one or more supplemental attestation elements comprise one or more of: time data, location data, satellite navigation system data, a pseudo-random-noise (PRN) code, an asymmetric key, and data received from a blockchain or blockchain related technology.

4. The device of claim 2, wherein the first controller generates an image data pipeline description that identifies one or more processes applied to the image data to produce the representation of the image data, wherein the attestation package further comprises the image data pipeline description.

5. The device of claim 1, wherein the hardware security module is further coupled to a second controller external to the secure enclave, wherein the first controller adds one or more supplemental attestation elements to the attestation package based on an indication from the second controller.

6. The device of claim 1, wherein the hardware security module further comprises a video encoder to encode the image data based on a codec to produce an encoded video data, wherein the representation of the image data comprises the encoded video data.

7. The device of claim 1, wherein the hardware security module further comprises one or more machine learning models that generate a tokenization of one or more features extracted from the image data, wherein the first controller generates the representation of the image data as a computer vision rendering of the image data based at least on the tokenization of the one or more features.

8. The device of claim 1, wherein the hardware security module further comprises one or more machine learning models that generate at least a classification characterizing one or more features extracted from the image data, wherein the representation of the image data comprises the classification characterizing one or more features extracted from the image data.

9. The device of claim 1, wherein the at least one image sensor authenticates with the hardware security module based at least on an authenticated key exchange.

10. The device of claim 1, wherein the at least one data bus comprises at least one of an $I^2C$ protocol channel and a MIPI protocol channel.

11. The device of claim 1, wherein the hardware security module is configured to generate metadata comprising a precommitment of the attestation package for submission to a blockchain or blockchain related technology.

12. A device comprising:
at least one image sensor associated with a hardware device identifier; and
a processing device coupled to the at least one image sensor, wherein the processing device comprises a secure enclave that includes an attestation package assembly function, wherein the attestation package assembly function receives a trusted image data bundle from the at least one image sensor, wherein the trusted image data bundle includes image data captured by the at least one image sensor and the hardware device identifier;
wherein the attestation package assembly function is configured to generate an attestation package comprising a plurality of attestations that include at least a representation of the image data and a representation of the hardware device identifier, and to apply a cryptographic signature to the attestation package using a signature key, wherein the signature key is associated with a video session comprising a video image sequence of the image data and when the video session is started, a zero-knowledge proof is created showing that the signature key is signed by a key in a published database of authentic hardware keys, without revealing identifying information associated with the device; and
wherein the processing device comprises an interface configured to output a set of attested media data based on the attestation package.

13. The device of claim 12, wherein the attestation package comprises a tree structure comprising data fields representing individual attestations of the plurality of attestations.

14. The device of claim 12, wherein the attestation package further comprises one or more supplemental attestation elements, each representing information associated with one or more of: the image data, the capturing of the image data, the detection of features from the image data, the classification of features from the image data, and one or more processes performed to produce the representation of the image data.

15. A system comprising:
at least one memory component; and
one or more processing devices coupled to the at least one memory component, the one or more processing devices to perform operations comprising:
receiving a trusted image data bundle from an image sensor, wherein the trusted image data bundle includes image data captured by at least one image sensor and a hardware device identifier associated with the image sensor, wherein the hardware device identifier includes at least a first public key associated with the image sensor, and a second public key associated with the one or more processors;
generating an attestation package comprising a plurality of attestations that includes at least a representation of the image data and a representation of the hardware device identifier; and
generating an output comprising a set of attested media data based on applying a digital signature to the attestation package using a signature key, wherein the signature key is associated with a video session comprising a video image sequence of the image data and when the video session is started, a zero-knowledge proof is created showing that the signature key is signed by a key in a published database of authentic hardware keys, without revealing identifying information associated with the system.

16. The system of claim 15, the operations further comprising:
based on the image data, generating the representation of the image data to comprise at least one of:
encoded video data based on the image data;
a computer vision rendering of the image data based at least on one or more features extracted from the image data by one or more machine learning models; and
one or more classifications characterizing the one or more features extracted from the image data by the one or more machine learning models; and
wherein when the representation of the image data does not include the encoded video data, the plurality of attestations comprises at least one attestation confirming that the representation of the image data does not include the encoded video data.

17. The system of claim 15, the operations further comprising:
applying a selective disclosure redaction of one or more of the plurality of attestations to generate a distribution version of the set of attested media data for presentation by a presentation application; and wherein the presentation application validates the distribution version of the set of attested media data using one or more validation resources based at least on the signature key.

* * * * *